United States Patent
Shatford et al.

(10) Patent No.: US 8,076,869 B2
(45) Date of Patent: Dec. 13, 2011

(54) QUANTUM DIMMING VIA SEQUENTIAL STEPPED MODULATION OF LED ARRAYS

(75) Inventors: Will Shatford, Pasadena, CA (US); Waqidi Falicoff, Stevenson Ranch, CA (US); William A. Parkyn, Lomita, CA (US); Yupin Sun, Yorba Linda, CA (US)

(73) Assignee: Light Prescriptions Innovators, LLC, Altadena, CA (US)

( * ) Notice: Subject to any disclaimer, the term of this patent is extended or adjusted under 35 U.S.C. 154(b) by 279 days.

(21) Appl. No.: 12/589,071

(22) Filed: Oct. 16, 2009

(65) Prior Publication Data

US 2010/0097002 A1    Apr. 22, 2010

Related U.S. Application Data

(60) Provisional application No. 61/106,524, filed on Oct. 17, 2008, provisional application No. 61/210,647, filed on Mar. 20, 2009.

(51) Int. Cl.
*G05F 1/00* (2006.01)

(52) U.S. Cl. ........ 315/294; 315/291; 315/360; 315/312; 315/315; 362/27; 362/552; 359/385; 359/388

(58) Field of Classification Search ............... 315/291, 315/294, 312, 360, 307, 315, 153, DIG. 4; 362/27, 552, 555; 359/385, 388, 641
See application file for complete search history.

(56) References Cited

U.S. PATENT DOCUMENTS

| | | | |
|---|---|---|---|
| 3,923,381 A | 12/1975 | Winston | 350/293 |
| 6,896,381 B2 | 5/2005 | Benitez et al. | 359/858 |
| 7,170,480 B2* | 1/2007 | Boldt et al. | 345/83 |
| 7,286,296 B2 | 10/2007 | Chaves et al. | 359/641 |
| 7,518,319 B2* | 4/2009 | Konno et al. | 315/291 |
| 7,557,524 B2* | 7/2009 | Chevalier et al. | 315/318 |
| 7,905,634 B2* | 3/2011 | Agurok et al. | 362/296.01 |
| 2007/0210722 A1 | 9/2007 | Konno et al. | 315/185 S |
| 2008/0164825 A1 | 7/2008 | Terlizzi et al. | 315/210 |
| 2008/0180414 A1 | 7/2008 | Fung et al. | 345/204 |
| 2009/0067179 A1* | 3/2009 | Chaves et al. | 362/329 |
| 2009/0225529 A1* | 9/2009 | Falicoff et al. | 362/84 |

FOREIGN PATENT DOCUMENTS

JP    2004/207411 A    7/2004

* cited by examiner

*Primary Examiner* — Haiss Philogene
(74) *Attorney, Agent, or Firm* — Drinker Biddle & Reath LLP

(57) ABSTRACT

In one method of and apparatus for varying the luminosity of illumination, each of a plurality of light sources has an on state in which it emits light and an off state in which it does not emit light. Each of the plurality of light sources is switched cyclically between the on state and the off state in a sequence over a cycle period. The switching sequence is selected such that the number of said light sources that are on is uniform over the cycle. The luminosity of the illumination is varied by varying the proportion of each cycle for which each light source is switched on.

20 Claims, 17 Drawing Sheets

| #On | LED1 | LED2 | LED3 | LED4 | LED5 |
|---|---|---|---|---|---|
| 5 | 1 | 1 | 1 | 1 | 1 |
| 4 | 0 | 1 | 1 | 1 | 1 |
|   | 1 | 0 | 1 | 1 | 1 |
|   | 1 | 1 | 0 | 1 | 1 |
|   | 1 | 1 | 1 | 0 | 1 |
|   | 1 | 1 | 1 | 1 | 0 |
| 3a | 0 | 0 | 1 | 1 | 1 |
| b | 1 | 0 | 0 | 1 | 1 |
| c | 1 | 1 | 0 | 0 | 1 |
| d | 1 | 1 | 1 | 0 | 0 |
| e | 0 | 1 | 1 | 1 | 0 |
| 2 | 0 | 0 | 0 | 1 | 1 |
|   | 1 | 0 | 0 | 0 | 1 |
|   | 1 | 1 | 0 | 0 | 0 |
|   | 0 | 1 | 1 | 0 | 0 |
|   | 0 | 0 | 1 | 1 | 0 |
| 1 | 0 | 0 | 0 | 0 | 1 |
|   | 1 | 0 | 0 | 0 | 0 |
|   | 0 | 1 | 0 | 0 | 0 |
|   | 0 | 0 | 1 | 0 | 0 |
|   | 0 | 0 | 0 | 1 | 0 |
| 0 | 0 | 0 | 0 | 0 | 0 |

QUANTUM DIMMING VIA SEQUENTIAL STEPPED MODULATION OF LED ARRAYS

CROSS REFERENCE TO RELATED APPLICATIONS

This application claims benefit of U.S. Provisional Patent Application No. 61/106,524 titled "Dimmable LED Light Sources," filed Oct. 17, 2008 in the name of Falicoff et al. and U.S. Provisional Patent Application No. 61/210,647 titled "Quantum Dimming via Sequential Stepped Modulation of LED Arrays," filed Mar. 20, 2009 in the name of Shatford et al., both of which are incorporated herein by reference in their entirety.

Reference is also made to:
- U.S. patent application Ser. No. 12/587,246 and International Patent Application No. PCT/US 2009/059495, both filed on Oct. 5, 2009, claiming priority from US Provisional Application No. 61/195,290 titled "Compact LED Downlight with Cuspated Flux-Redistribution Lens" filed on Oct. 6, 2008.
- U.S. patent application Ser. No. 12/456,392 and International Patent Application No. PCT/US 2009/003593, both filed on Jun. 15, 2009, titled "Multi-Reflector Cylindrical Light-Source with Interior LEDs and Exterior Heat Sink."
- US Patent Application No. 2009/0225529 and International Patent Application No. WO 2009/105198 titled "Spherically Emitting Remote Phosphor."
- US Patent Application No. 2009/0067179 titled "Optical Device For LED-Based Lamp."
- U.S. Pat. No. 7,286,296 to Miñano et al., U.S. Pat. No. 6,896,831 to Miñano, and U.S. Pat. No. 3,923,381 to Winston.

All of those patents and applications are incorporated herein by reference in their entirety.

BACKGROUND OF THE INVENTION

The dimming of artificial illumination is beneficial for energy conservation, since it enables many users to reduce light levels to suit individual preferences. Also, occupancy sensors in commercial establishments can run on dim when no customers are nearby. Further, dimming is integral for a lighting backup in day-lighting systems of large buildings. On partly cloudy days, fluctuating solar illumination is compensated for by responsive artificial lighting that varies in opposition to changes in sunlight to produce constant illuminance. Finally, smart electrical grids of the future may incorporate dimming of lights to handle variable loads or emergency situations.

As LEDs replace incandescent lighting, retrofitting will result in many LED lamps being connected to pre-existent dimmer switches. The most prominent types of dimmer switch are the rheostat, which simply lowers the line voltage, and the triac, which acts as a phase dimmer by zeroing out the line voltage during a given fraction of each AC cycle. In either case, a direct AC-to-DC conversion from incoming dimmed AC power to the DC power required by LEDs will have disadvantages. As rheostat output voltage is reduced, the current through the LEDs is reduced in proportion, and at low enough levels the current through the LEDs will fall below their threshold level, which can damage them. With the triac, the LEDs are off for part of each AC cycle, resulting in a perceptible flicker and possibly some audible noise.

When LEDs have their own power supply in a new installation, dimming is usually accomplished by pulse-width modulation, which is conceptually similar to a triac's phase dimming of AC line voltage, except that the modulation is then typically at too high a frequency to be seen by the human eye. The line power to such a new installation would never have a standard dimmer on it. In retrofits however, it would be advantageous to avoid the costs of replacing a pre-existent dimmer, since the decision to retrofit in the first place is highly cost-sensitive. This places a premium on adaptable power supplies for LED lighting.

Although LEDs are specifically described, the principles of the present application can of course be applied to other forms of light sources, including light sources hereafter to be developed.

SUMMARY OF THE INVENTION

An embodiment of the present invention provides a method of and apparatus for varying the luminosity of illumination, in which a plurality of light sources each has an "on" state in which it emits light and an "off" state in which it does not emit light. Each of the plurality of light sources is switched cyclically between the on state and the off state in a sequence over a cycle period. The switching sequence is selected such that the number of said light sources that are on is uniform over the cycle. The luminosity of the illumination is varied by varying the proportion of each cycle for which each light source is switched on.

Another embodiment of the invention provides a method of and apparatus for varying the luminosity of illumination, in which each of a plurality of light sources has an on state in which it emits light and an off state in which it does not emit light. Each of the plurality of light sources is switched cyclically between the on state and the off state in a sequence over a cycle period. All of the plurality of light sources are switched in the same sequence but spaced uniformly over the cycle period. The cycle period divided by the number of light sources gives a frequency below the threshold flicker frequency of the Standard Human Observer.

Another embodiment of the invention provides a method of and apparatus for varying the luminosity of illumination, in which a plurality of light sources each has an on state in which it emits light and an off state in which it does not emit light. Each of the plurality of light sources switches cyclically between the on state and the off state in a sequence over a cycle period. The sequence is such that: at least one light source is in the on state at any time, and the number of light sources in the on state at any time does not change by more than one over the cycle. The luminosity of the illumination is varied by varying the average number of light sources illuminated at any time. The cycle period is shorter than the threshold flicker frequency of the Standard Human Observer.

Another embodiment of the invention provides a method of and apparatus for varying the luminosity of illumination, in which a plurality of light sources each has an on state in which it emits light and an off state in which it does not emit light. Each of the plurality of light sources is switched cyclically between the on state and the off state in a sequence over a cycle period. The cycle period is divided into a number of equal steps that is an integer multiple of the number of light sources, the light sources are switched between the on and off states only at the beginning of a step, and different light sources are on during different steps. The luminosity of the illumination is variable by varying the number of steps within each cycle period for which each light source is in the on state.

In one aspect, a "uniform" number of light sources may be kept equal for all switching steps within the cycle. In another aspect, a small variation in the number of light sources that are on may be permitted, for example, the number may vary by not more than one. The switching of different light sources may then be coordinated such that at least one light source is in the on state during every step.

In one aspect, all of the plurality of light sources may be switched in sequences that are identical but staggered evenly over the cycle period.

In one aspect, the length of time for which each light source remains on may be kept constant, and the number of times within each cycle that each light source is switched on may be varied, when varying the luminosity.

Alternatively, the length of time for which each light source is switched on may be varied when varying the luminosity.

In one aspect, the length of time for which a light source remains on may be an integer multiple of the cycle time divided by the number of light sources.

In one aspect, the light sources may be spaced apart, and the order in which they are switched on and off may then be selected to maximize the frequency of any spatial shift in the illumination pattern produced by the plurality of light sources.

In one aspect, each of the plurality of light sources may comprise a plurality of light-emitting elements switched in unison.

In one aspect, the cycle rate may be slower than the threshold flicker frequency of the Standard Human Observer. The rate of switching events within the cycle may then be above that threshold flicker frequency. Alternatively, the rate of switching events within the cycle may be below said threshold flicker frequency, and the light outputs of the plurality of light sources may then be sufficiently spatially homogeneous that any flicker is imperceptible to an ordinary human observer.

In one aspect, the light sources may be spatially separated, and light from different ones of those light sources may be homogenized by an optical homogenizer.

In one aspect, when one of the plurality of light sources malfunctions, the method may continue using only the remaining light sources. The cycle time may then be shortened, keeping the rate of switching events constant.

In one aspect, the temperature of the light sources may be monitored and, when overheating is detected, the number of steps within each cycle period for which each light source is in the on state may be reduced.

In one aspect, the number of steps per cycle may be minimized, and subject to that constraint the number of times within each cycle period that a light source is switched between the on and off states may be maximized.

In an embodiment, at any level of luminosity the number of light sources that are on during a step varies by at most one from step to step over a cycle.

Another embodiment of the invention provides methods of and apparatus for varying the luminosity of illumination combining the features of two or more of the above-mentioned embodiments and aspects.

A further embodiment of the invention provides a lighting controller arranged to be connected to and to control a plurality of light sources so as to form a lighting apparatus according to any of the above embodiments and aspects of the invention.

Another embodiment of the invention provides a computer readable storage medium containing computer readable code to cause a processor of a suitable lamp to carry out one or more of the methods of any embodiment or aspect of the invention.

Because LED chips are unlikely to become large over at least the next decade, higher luminosity levels require multiple chips in a light source. Today's largest commercial LED packages can have four or nine close-packed chips, but heat considerations severely limit this approach. Arrays of ten to a hundred chips almost inevitably have them separated and individually powered, and their light combined by an optical homogenizer. Then it would be relatively inexpensive for a microprocessor-based controller to individually tailor the power waveform to each chip. Embodiments of the present invention use "quantum dimming" or "Stepped Sequential Modulation" (SSM). That produces a given fractional luminosity from an LED array by powering that very fraction of the array's chips. Further, embodiments of the present invention can adapt to a triac's fractional output and still deliver luminosity throughout each AC cycle, resulting in a truly static output, devoid of any flicker whatsoever. Still further, embodiments of the present invention rotate the load across all the chips so that each chip accumulates the same long-term-integrated current.

The latter objective is one of the motivations for the novel and unique way that the LEDs of certain embodiments of the present invention are powered for control of overall light level. The quantum dimmer only produces light levels attainable by an integer number of individual LEDs running at full power. As such it is contemplated for arrays of numerous LEDs, such as four or more.

The prior-art pulse-width modulation (PWM) method dates from 1940 and was an obvious way to control LEDs once they had become luminous enough to replace light bulbs, about the 1990's. Starting with a duty cycle at a frequency too high for human vision (over 60 Hz), the LED receives full power for a given fraction of that cycle, and no current during the remainder. Embodiments of the present invention, in contradistinction, comprise multiple LEDs that achieve fractional illumination by having that fraction of the number of LEDs at full power and the remainder off. For the sake of LED longevity the load is rotated through the array so that all units accumulate the same power-on time. Rotation can also reduce heating of the LEDs and their associated driver/s, allowing a higher light output. If heating of the LEDs is a limiting factor at full output (when the LEDs are all on continuously), this may enable non-uniform spacing of the dimmed light levels where that is desired. Only when the LED outputs are not homogenized is there any issue of the speed of the load sharing having to be too rapid for visibility.

It is important to differentiate the present methods and apparatus from the prior art where PWM of an LED array is employed to dim the light source. In the prior art all of the LEDs in the entire LED array are pulsed at the same frequency and in unison. That is, some of the time all the LEDs in the array are turned on and the rest of the time all the LEDs in the array are turned off. Typically the time it takes for an LED to turn on is very short, many times faster than other light sources. There is also very little delay from the time when the power to an LED is turned off until the light source no longer produces any light. This is different than for other types of devices where PWM is used, such as motors. A motor typically has considerable inertia, both electrical (inductance) and mechanical, so that a comparatively slow, and/or comparatively uneven, PWM power supply can be used without noticeable fluctuation in the motor output. In these applications a different form of PWM is employed such that the output from the array appears more like a saw tooth.

In the case of LEDs the optimum pulse is nearly a square wave. So for the prior art when the LED array is dimmed, at some time, all the LEDs in the array will be off. This requires that the frequency of the pulse is sufficiently high for the eye not to see flicker. A proposed standard from the US Department of Energy (DOE) for solid state lighting would require this frequency to be 124 Hz or higher. So one benefit of an embodiment of the new invention is that it does not require pulse width modulation of the light output, as one or more LEDs in the array are always on, at all non-zero levels of dimming. The frequency of this load sharing shift can be adjusted from hundreds of hertz to minutes, hours or days, whatever is desired. For example, in one embodiment of the invention a different set of LEDs can be turned on each time the light source is activated. A microprocessor determines which of the LEDs will be used during this activation cycle for dimming. Thus uniform distribution of the load for the LEDs is possible over a short period of time (milliseconds) or over a long period of time, many years for example.

Moreover, embodiments of the invention have several other advantages over the prior art of PWM. With PWM for an array of LEDs, the peak power (usually the product of the peak voltage times the peak current) of the array is the sum of the peak powers of all the LEDs in the entire array, even during the dimming mode. This requires that the electronic components for such as system handle the peak load every time the LEDs are turned on. This is not the case for systems described in the present application, which use the novel approach of Stepped Sequential Modulation (SSM). In the SSM dimming method, the peak power is proportional to the dimming level. At the lowest dimming setting the peak power is only the draw of a single LED or light source. This reduces the peak loads on the electronic components during dimming (which can potentially extend the life of these components).

Also, SSM more efficiently utilizes the AC power available as the multi-LED lamp (which can be in the form of a bulb) is dimmed. As the AC signal is clipped during dimming, the average power available to support driving the light sources, for example the LEDs, is reduced. In particular, triac dimming always clips only the leading edge of each half-cycle, because the triac can cut off automatically and cleanly at the zero-crossing at the end of the half-cycle. As a result, once the triac-dimmed AC signal is clipped to less than 50%, the peak voltage, as well as the duration, starts to decrease with further clipping. As was stated before, PWM systems turn all of the LEDs on and off at the same time. The LEDs are typically connected in series, to avoid the extra complexity of isolating or balancing parallel feeds to imperfectly matched LEDs, and so require a relatively large driving voltage that does not decrease as the duty cycle decreases. Thus, as the duty cycle decreases the PWM system must not only buffer the incoming energy to supply power pulses to the LEDs during the increasingly large gaps in the incoming AC, but must also boost the effective voltage of the incoming AC by an increasing amount to provide a steady voltage to the LEDs. Further, the output from the buffer is drawn in short but intense pulses of current. Both of these factors not only add to the complexity of the buffer and the electronics but also have a deleterious effect on the reliability and efficiency of the pulse width modulated system. Tests have shown that such systems lose efficiency as light output is dimmed.

With the SSM system disclosed herein, only the necessary number of LEDs for a dim level are turned on at any time. For example, with a 5-LED bulb that is dimmed to 60%, only 3 LEDs are turned on and, therefore, only 60% of the maximum power for the LEDs is required from the LED driver. For a 5-LED bulb dimmed to 20%, only one LED is turned on. Therefore, even if the LEDs are powered in series (and thus require a high voltage at full output), the voltage required decreases as the AC signal duty cycle decreases and the effective available AC average supply voltage decreases. Alternatively, because the LEDs are separately controlled, they can be sufficiently isolated to be powered in parallel without additional overhead. In addition, because the power requirement of the SSM system is steady, not pulsed, and decreases as the average power of the dimmed AC source decreases, a smaller and simpler buffer, and smaller components and less complicated electronics to handle the current drawn from the buffer, can be used.

An embodiment of the invention has an optical homogenizer that is used in conjunction with an array of LEDs. This system spatially mixes the luminosity of the members of the array into perceptible uniformity, as well as into chromatic uniformity in the case of a multi-wavelength array of LED chips, or even a poorly binned batch of a single color. In most applications, the homogenized output is hemispheric, but must be cast as an illuminating beam. Thus, embodiments of the present invention also comprise optionally a collimator coupled to the optical homogenizer. Due to the conservation of etendue, the collimator has an output aperture larger than that of the optical homogenizer, inversely proportional to the sine of the beam half-angle. Both optical homogenizer and collimator are very generic categories of optical devices for illumination, with a long history in the prior art. There are, however, some novel optical designs that are better suited for working with this embodiment. A suitable optical system that uses an homogenizer is provided in aforementioned U.S. patent application Ser. No. 12/587,246 and International Patent Application No. PCT/US 2009/059495, both filed on Oct. 5, 2009.

After 1950, cinema expanded its screen in order to compete for family entertainment with the newly arrived home television set and its free programming. Only arc lamps could supply the requisite luminosity, but they are highly non-uniform sources that required optical homogenizers between the arc lamp and the image-bearing film that was to be projected onto the screen. In like regard the present invention can comprise any kind of optical homogenizer and optionally any kind of compatible optical collimator, both of which have a wide variety of publicly available art. The mixing box, or integrating cavity, has been well known for over a century. It is central to the use of brightness-enhancing films for LED backlights, and would be a typical optical homogenizer contemplated for specific preferred embodiments of the present invention.

The optical homogenizer of the present invention can alternatively comprise the optical manifold of aforementioned U.S. Pat. No. 7,286,296 to Miñano et al. For applications where the light needs to emit beyond a hemisphere, such as is the case if the light source must emulate an incandescent bulb, then the optical homogenizer can make use of the apparatus taught in aforementioned US Patent Application No. 2009/0225529 and International Patent Application No. WO 2009/105198. A similar device is taught in aforementioned US Patent Application No. 2009/0067179.

The optical collimator used in some embodiments of the present invention can comprise a compound parabolic concentrator, originally disclosed in U.S. Pat. No. 3,923,381 to Winston, or alternatively an RXI lens, disclosed in U.S. Pat. No. 6,896,831 to Minano. Many designs of collimators and concentrators are well known in the art. In the interests of conciseness, the discussion hereinafter will disclose the electronic implementation of quantum dimming, and no particular optical homogenizer or collimator will be presumed or illustrated in the Figures.

There are also embodiments of the invention that do not require a component for homogenization of the light from the LEDs. These include embodiments comprising an LED array, wherein each LED is separately collimated into a common output direction or onto a shared illumination pattern.

In one embodiment the change in illumination at each step (when the light output is shifted from one LED or group of LEDs to the next without a change in the output level, in order to share the load evenly) is imperceptible and a very slow load-sharing step rate, or cycle frequency, may be used. That may be the case if, for example, all the light outputs are completely homogenized, or if the light from individual LEDs is equal and is separately collimated such that the collimators are accurately aligned so that their illumination patterns coincide accurately at the target, or if each separately switched light source is itself an array of LEDs, and the different arrays are spatially interlaced.

In many applications, the LED driving and collimation can be aligned well enough to leave only a small, practically imperceptible, difference in the spatial distributions or intensities of the light from different ones of the light sources, but the shift from one pattern to the next at each step can still be noticeable to a user because the human eye is very sensitive to sudden changes in what it sees. In many of those embodiments, the step rate is chosen to be faster than the fastest flicker that a human eye can perceive, but the cycle rate may be slower by a factor equal to the number of steps in the cycle, which is commonly equal to the number of independently switchable LEDs or groups of LEDs.

In one embodiment the load-sharing step rate is preferably of sufficient rapidity that the source does not appear to shift or flicker, even when viewed directly, or even when the light patterns from different steps are visibly different. In that situation, the time for a complete cycle through all the steps in the load-sharing must be shorter than the minimum cycle time at which a flicker is perceptible, so that no light source appears to flicker. In an application with a LED array of N members, a number X between 1 and N members will be on at any time, where X depends on the dimming levels. At no dimming, all X=N members will be on. At the lowest non-zero dim level only X=1 members will be on. With a minimum anti-flicker rate AFR, the cycle must be completed in a period of 1/AFR, and the maximum on time for each LED at each dim level is X/N times this period. For example, in the sequential stepped modulation (SSM) system with 4 LEDs in the array and 250 Hz anti-flicker rate, at the lowest dim level each LED is on for one millisecond. An example of an optical system that is properly configured to take advantage of this embodiment of the invention is shown in aforementioned U.S. patent application Ser. No. 12/456,392 and International Patent Application No. PCT/US 2009/003593.

Load-sharing also has the benefit of fault tolerance against an LED failure, especially in those embodiments with no, or little, spatial non-uniformity. In most PWM based lamps the LEDs are all connected in series and failure of a LED causes failure of the entire lamp. With load-sharing, however, an LED failure will not cause failure of the entire lamp, but at most failure of one of the separately switchable light sources. The lamp can continue working, just at a reduced output. The lamp can continue to work as long as even just one LED is operational.

If the controller electronics is able to detect the failure, it can take the defective light source out of service, and continue with a shorter cycle and/or slower steps using the remaining light sources. If the controller electronics does not detect the failure, or if a multi-LED source with only a single defective LED is not taken out of service, the lamp continues to operate, although with uneven output from the different sources used in different steps of the cycle. If the overall cycle rate is less than the anti-flicker rate, then some flicker may be perceptible until the defective LED is replaced. A flickering light is for many purposes preferable to no light at all.

In one embodiment a sensor for chip over-temperature is included. LED performance is reduced at higher chip temperatures, and the LEDs may even fail. LEDs generate heat and the addition of high ambient temperature conditions may cause the LED to operate unsafely. To reduce the temperature of the light source if overheating is detected, automatic dimming is implemented. That reduces the heat generated by the LEDs and can lower the overall temperature of the light source to a sustainable level.

Aspects of the present invention include methods of quantum dimming of lamps by varying SSM patterns of multiple light sources, methods of operating lamps using SSM patterns corresponding to the intermediate levels of SSM quantum dimming sequences, and apparatus for carrying out either or both of those methods.

BRIEF DESCRIPTION OF THE DRAWINGS

The above and other aspects, features and advantages of the present invention will be apparent from the following more particular description, presented in conjunction with the following drawings wherein.

DETAILED DESCRIPTION OF THE PREFERRED EMBODIMENTS

A better understanding of various features and advantages of the present invention will be obtained by reference to the following detailed description of the invention and accompanying drawings, which set forth illustrative embodiments in which principles of the invention are utilized.

Figure 1:
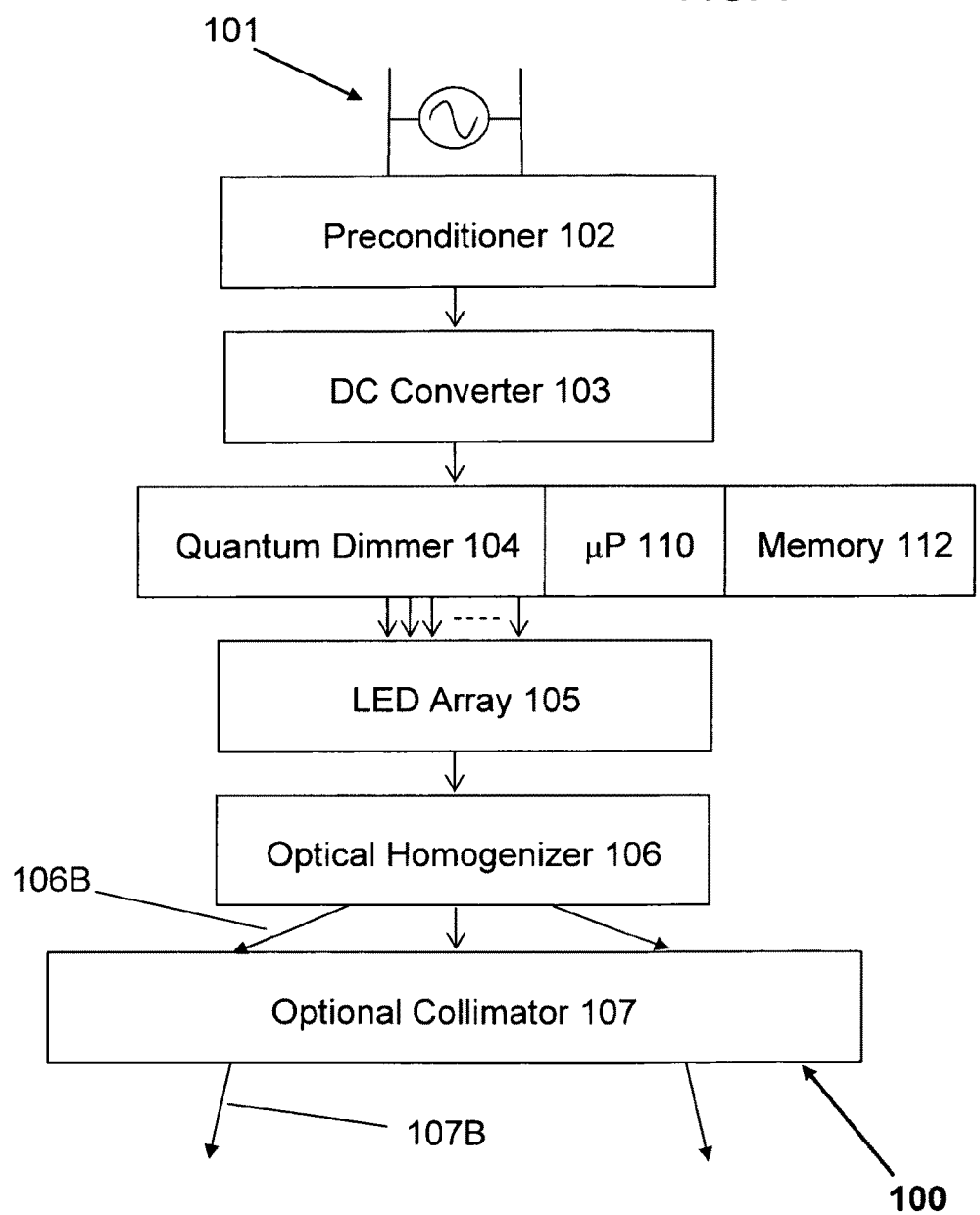
FIG. 1 is a block diagram of a multi-LED illuminator with sequential stepped modulation.

FIG. 1 shows an embodiment of a multi-LED illuminator, indicated generally by the reference number 100, comprising AC input line 101, pre-conditioner 102 for the incoming AC power from line 101, DC converter 103 receiving power from the pre-conditioner 102, quantum dimmer 104 supplied with power from the DC converter 103, LED array 105 driven by the quantum dimmer 104, optical homogenizer 106 homogenizing the light from all the LEDs in the array 105, and optional beam-forming collimator 107. AC input 101 may include a triac dimmer or other control that superimposes dimming commands on the incoming AC power. Such dimmer controls are well known and in the interests of conciseness are not further described herein. Indeed, many embodiments of the present devices and methods are specifically intended as retrofittable units to cooperate with a previously installed third party dimmer control of the prior art.

Some optical homogenizers 106 can output flux into a substantial solid angle. For example, a mixing chamber can act as optical homogenizer 106 and can have an exit aperture that emits light into a hemisphere. If it is desired, part or all of the wall of the mixing chamber can be of a material that is partially transmissive and partially reflective. The entire surface of the mixing chamber, or a very large part thereof, may then become the exit aperture. If the material of the mixing chamber is scattering then nearly spherical output can be achieved. Suitable materials for such a chamber include opal plastics, diffuse glass, and holographic diffuser film.

Quantum dimmer 104 selectively activates a subset of LED array 105, as described in more detail below, to produce dimmed-luminosity output. The optical output of homogenizer 106 is spatially uniform wide-angle output beam 106B. Optional collimator 107 is shown with greater width than homogenizer 106, because étendue conservation requires its narrow-angle output beam 107B to be larger than wide-angle output beam 106B. LED controller 104 would typically comprise microprocessor 110 and storage medium 112 for the programs and data for microprocessor 110, but may be incorporated as a number of discrete and/or active components. Pre-conditioner 102 may include circuitry for filtering, energy buffering, noise reduction, EMI suppression, power factor correction, and/or surge protection. Energy buffering may be sufficient to maintain a steady power supply to the LED controller 104 even when conventional dimmer circuits chop out most of the AC power.

Figure 2:
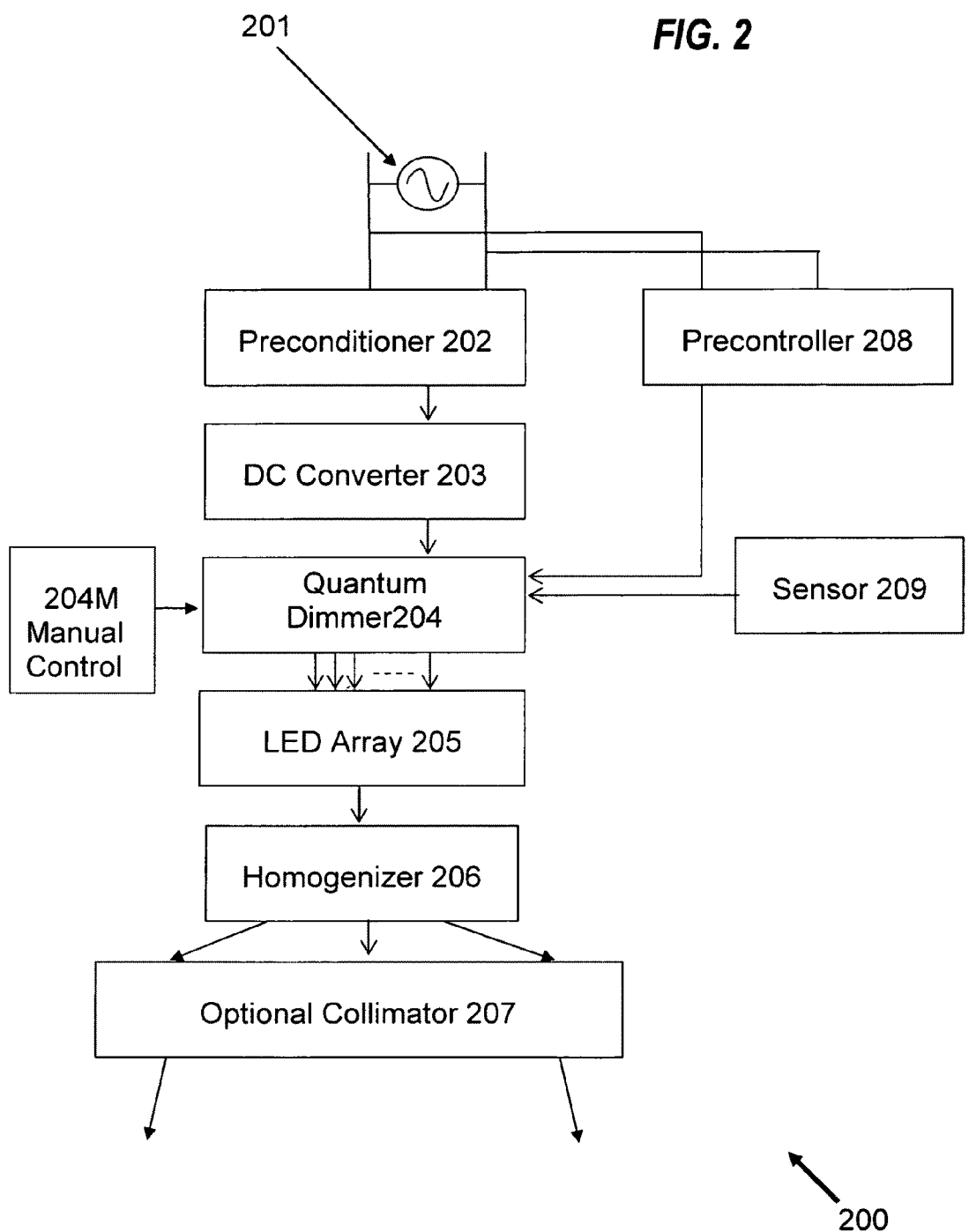
FIG. 2 is a block diagram similar to FIG. 1 with additional features.

FIG. 2 shows multi-LED illuminator 200, comprising AC input line 201, pre-conditioner 202, DC converter 203, quantum dimmer 204, LED array 205, optical homogenizer 206, and optional beam-forming collimator 207. Those features may be generally similar to the corresponding features in FIG. 1 and, in the interests of conciseness, the description of the similar features is not repeated. Illuminator 200 also comprises pre-controller 208, which directly senses the instantaneous voltage of AC input line 201 before the pre-conditioner 202, specifically to ascertain triac phase-modulation level, as well as brownouts and other fluctuations, and respond in accordance with a program that also responds to other data or communications intended to set a condition or set a desired behavior. Data from pre-controller 208 informs quantum dimmer 204. Illuminator 200 further comprises sensor 209, which informs LED controller 204 of such external conditions as occupancy, sunlight levels, or temperature. Precontroller 208 or sensor 209 may inform LED controller 204 of requests for dimming originating from a smart grid. In contrast to automated or preprogrammed dimmers, illuminator 200 also comprises manual input switch 204M, for occupants to set the high level of illuminance or other desired level of illumination. A system having any but not all of pre-controller 208, sensor 209, and manual control 204M is also possible.

A smart grid is an upgrade of 20th century power grids that generally distribute power from a few central power generators to a large number of users, to be capable of routing power in more optimal ways to respond to a very wide range of conditions. Smart grid proposals include systems for monitoring and/or controlling power consumption. In a smart grid, the quantum dimmer 104, 204 could be programmed to receive and respond to signals from a smart grid control system commanding a reduction in light intensity to reduce the load on the grid. Additionally, or alternatively, the quantum dimmer could be programmed to report its illumination setting to a controller, by data signals over the power lines 101, 201 or otherwise. The smart grid controller could for example request that all lights in a region are dimmed to the next lower setting to achieve a particular drop in power. Two-way communication could be implemented so that the Grid controlling software would know how much dimming is required for the millions of lights on its grid. Feedback loops between the lamps and the grid could be implemented so "soft" power reductions are achieved. The control could be implemented at any level from a regional (or even larger) power grid to a single building (or even smaller). Large scale control could involve the LED controller 204 communicating with a relay communication device in a larger building, which in turn connects to the smart grid. Alternatively, smart grid control could be implemented by modifying the triac dimmer that controls the luminaire 100, 200. If, however, a local control 204M or environmental sensor 209 on the individual quantum dimmer 204 can override the triac signal, the quantum dimmer 204 may still need to report its state to the triac control, so that the triac control can provide accurate data to the smart grid.

Figure 3:
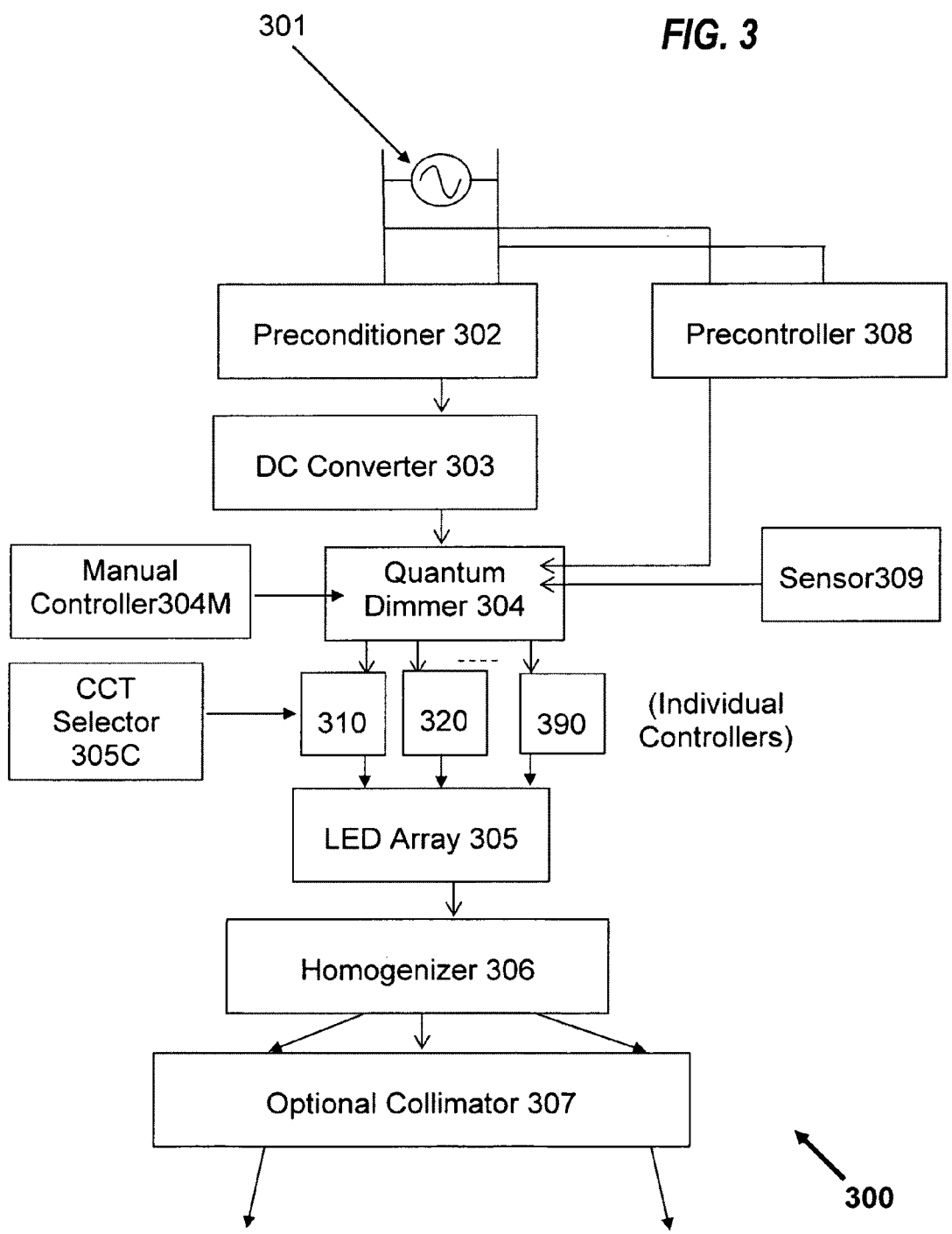
FIG. 3 is a block diagram similar to FIG. 2 with further additional features.

FIG. 3 shows a further form of LED illuminator 300. Parts of LED illuminator 300 that correspond to parts of LED illuminator 200 have numbers (301, 302, 303, 304, 304M, 305, 306, 307, 308, 309) greater by 100 than the corresponding numbers in FIG. 2, and reference is made to the description of the corresponding parts in FIGS. 1 and 2. LED illuminator 300 further comprises individual LED current controllers 310, 320, through 390, for adjusting relative currents at all levels of stepped sequential modulation. In the case of all the chips in LED array 305 being nominally the same, the adjustments would enable less costly unbinned LEDs to be used in the array. Then sensor 309 could be used to calibrate each individual controller 310, 320 . . . 390 to compensate for variations in the exact properties of the individual LED, so that each LED of the array would produce the same output when solely activated. Alternatively in the case of multiple types of LEDs, for example, LEDs of different colors in color mixers, these individual adjustments could further comprise a way for color temperature to be controlled, either by the occupants via a separate manual control 305C or by sensor 309.

In the case of multiple colors, the method of the present embodiment is to be distinguished from field sequential modulation of color video, wherein the three color frames are successively formed on a monochrome LCD and each is successively illuminated with its appropriate color. The present embodiment would simply have three arrays (or other appropriate number of arrays) of different colors that are separately configured with stepped sequential modulation. In the course of controlling overall chromaticity of the array, each of three arrays would have independent stepped sequential modulations that intermix in time. Thus, at all times, the appropriate proportional numbers of LEDs of all three colors are illuminated, but the stepping of the different colors is not necessarily in phase. Indeed, staggered stepping may reduce flicker in some configurations. The arrays of different colors may be spatially intermixed to improve the homogeneity of the output light.

Figure 4:
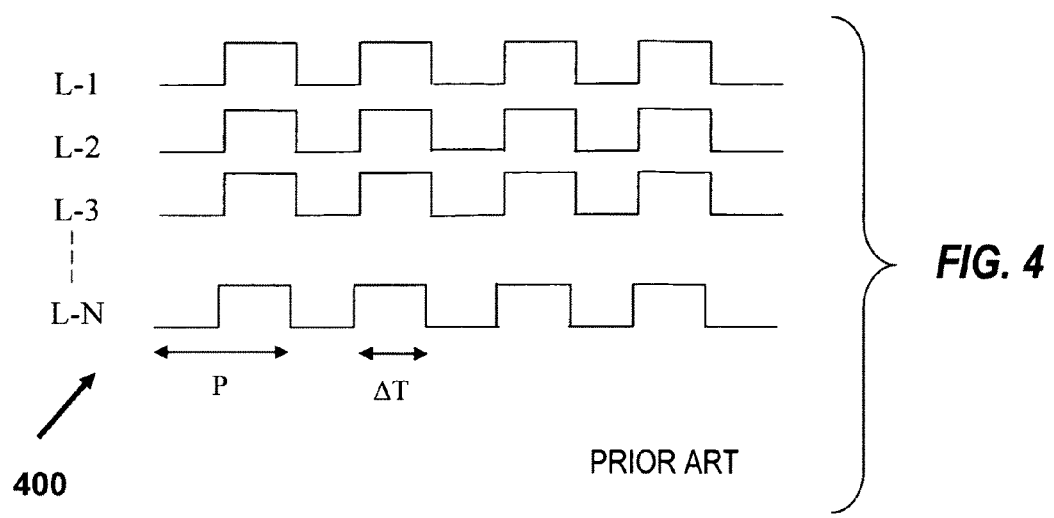
FIG. 4 is a temporal graph of pulse-width modulation waveform inputs to an LED array, showing the prior art.

FIG. 4 shows a schematic diagram 400 of a typical pulse-width modulation (PWM) scheme of the prior art for driving multiple LEDs, with the vertical dimension representing current and the horizontal dimension representing time. Graphs L-1, L-2, L-3, through L-N show identical time courses for the current into each of N LED chips, with PWM period P, on-duration ΔT, and the phase of the on-duration ΔT within the PWM period P the same for all chips, which can be considered the conventional approach. Dimming in the PWM system is controlled by varying the length of the on-duration ΔT as a fraction of the period P.

Figure 5:
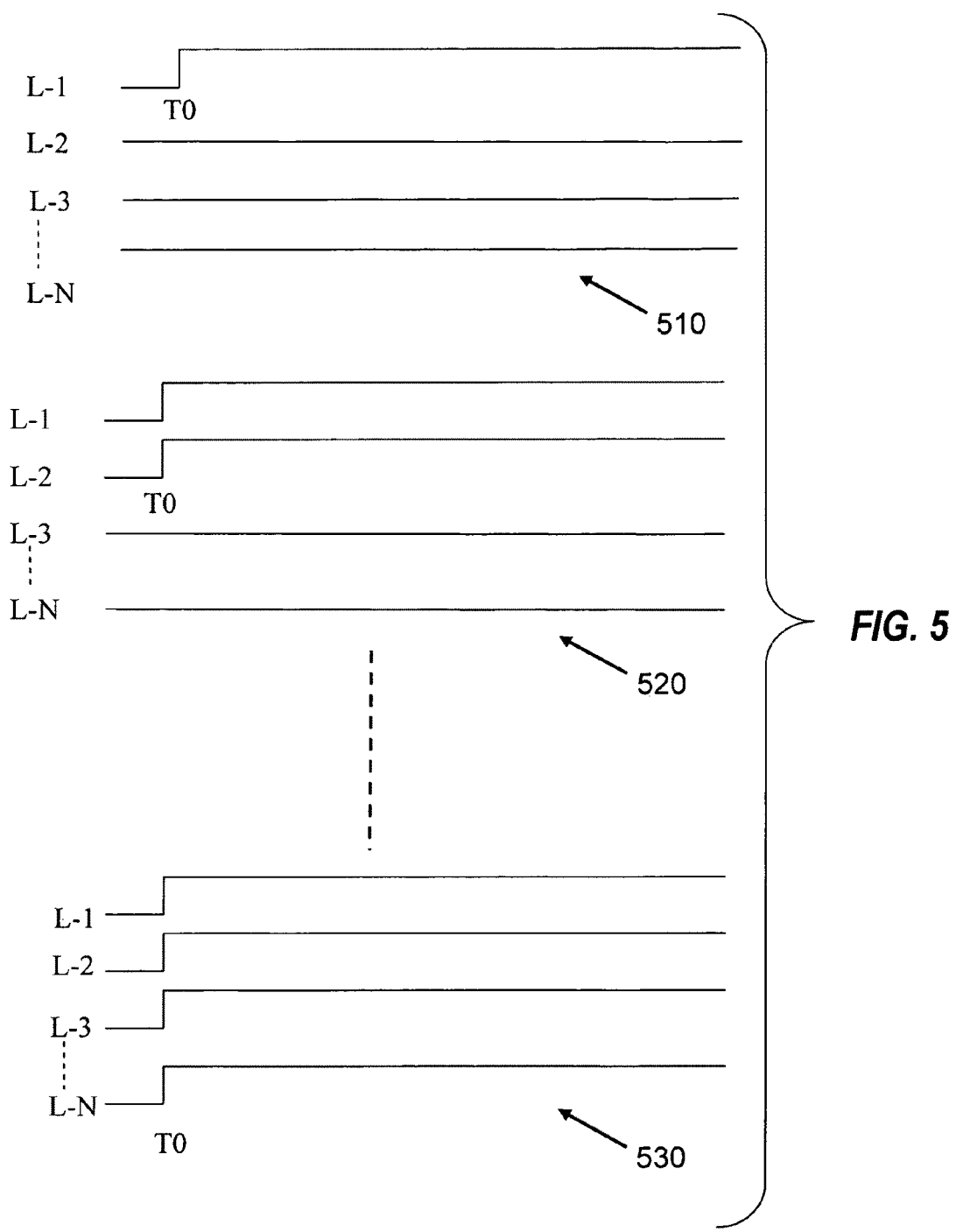
FIG. 5 is a temporal graph of quantum dimming.

FIG. 5 shows schematic diagrams of the sequential stepped modulation of a quantum dimmer. Diagram 510 shows graphs L-1 through L-N, with LED chip number one activated and the remainder being off. Diagram 520 shows two chips activated, and diagram 530 shows all chips activated. Diagrams 510, 520, 530 show part of a sequence starting in an "all off" state. The array is powered on at time T0, switching on the desired number of LEDs at the beginning of the first operating cycle.

Figure 6:
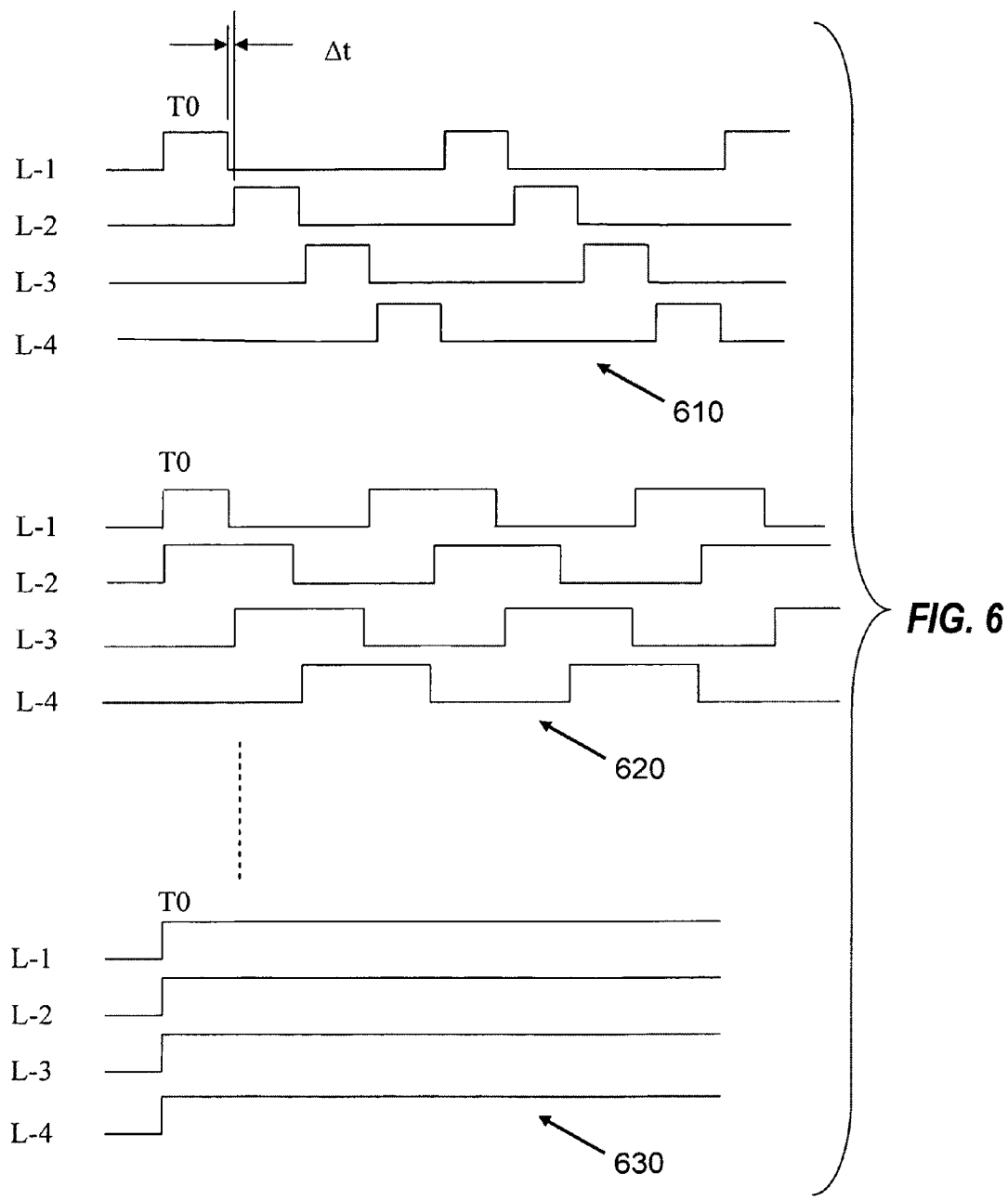
FIG. 6 is a temporal graph of quantum dimming with compensation for rise and fall times.

FIG. 6 shows schematic diagrams of the sequential stepped modulation of a quantum dimmer using four chips. Each of diagrams 610, 620, 630 in FIG. 6 shows graphs L-1 through L-4, representing the switching sequence of the 4 chips. The skilled reader will understand how to generalize to an arbitrary number N of chips. In FIG. 6, the various chips take turns, so that in the long run all the chips accumulate the same use. It may be seen that the first part of each of diagrams 610, 620, 630 in FIG. 6 corresponds to diagrams 510, 520, 530 in FIG. 5, respectively. The array is powered on at time T0. Diagram 610 shows a modulation sequence for how the various chips take turns being the sole one being activated, giving a constant illumination of ¼ (1/N in the generalized case) of maximum illumination. Diagram 620 shows how the higher luminance is attained by widening the on-time so that the pulses overlap, thereby having multiple LEDs turned on. Diagram 630 shows all chips activated. FIG. 6 also shows transition time Δt for rise to and fall from the activation current. The times of the rising and falling edges in the command signals L-1, L-2, L-3, L-4 from the quantum dimmer 104, 204, 304 are offset by transition time Δt to allow for the response times of the LEDs to the rising and falling edges being neither instant nor identical. During this time the fall in L-1 and the rise in L-2 will co-vary so as to produce as nearly as may be a constant luminance. As shown in FIG. 6, the falling edge leads the rising edge, because the specific LEDs turn on more quickly than they turn off. The skilled person will understand how to adjust Δt according to the known characteristics of specific LEDs, or by observation either manually or using the sensor 209, 309.

Figure 7:
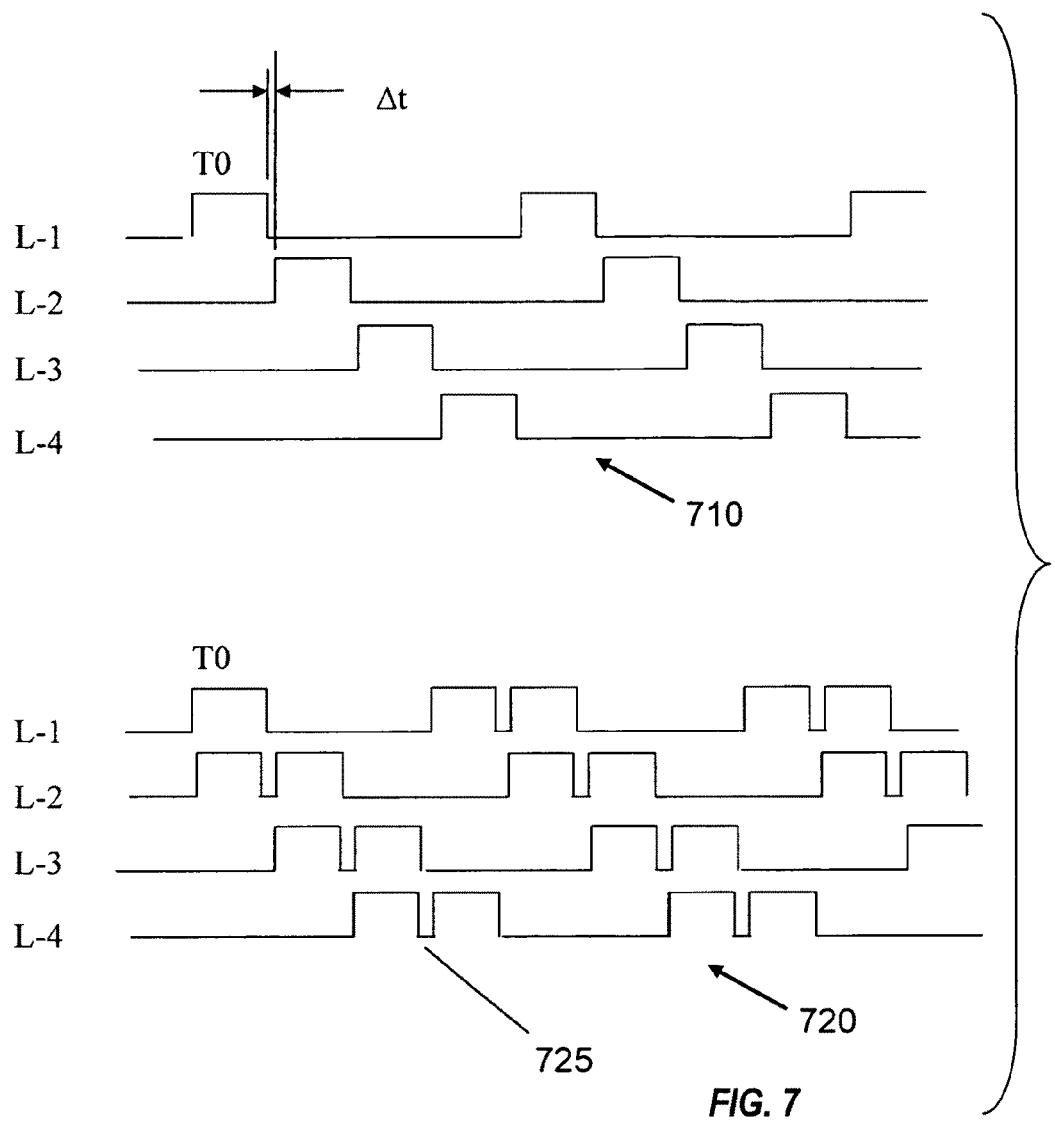
FIG. 7 is a temporal graph of quantum dimming with further compensation.

FIG. 7 shows schematic diagrams of the sequential stepped modulation of a quantum dimmer with further compensation for Δt at higher luminosity levels. Diagram 710 duplicates diagram 610 of FIG. 6 for convenient comparison. Diagram 720 corresponds to an activation of two LED chips at any one time. At the mid-point of each LED's on-time, the previous LED in the cycle switches off and the next LED switches on. For example, at the mid-point of L-4's on-time, L-3 switches off and L-1 switches on. At that point in time, graph L-4 has a brief central off-pulse 725. Off-pulse 725 compensates for a brief excess of light output caused by an overlap between the rise of L-1 and the fall of L-3, resulting in constant total luminosity throughout. This intermediate central pulse may also be used to better integrate LEDs over a broad operational range, and better integrate LEDs of different drive characteristics and colors.

Figure 8:
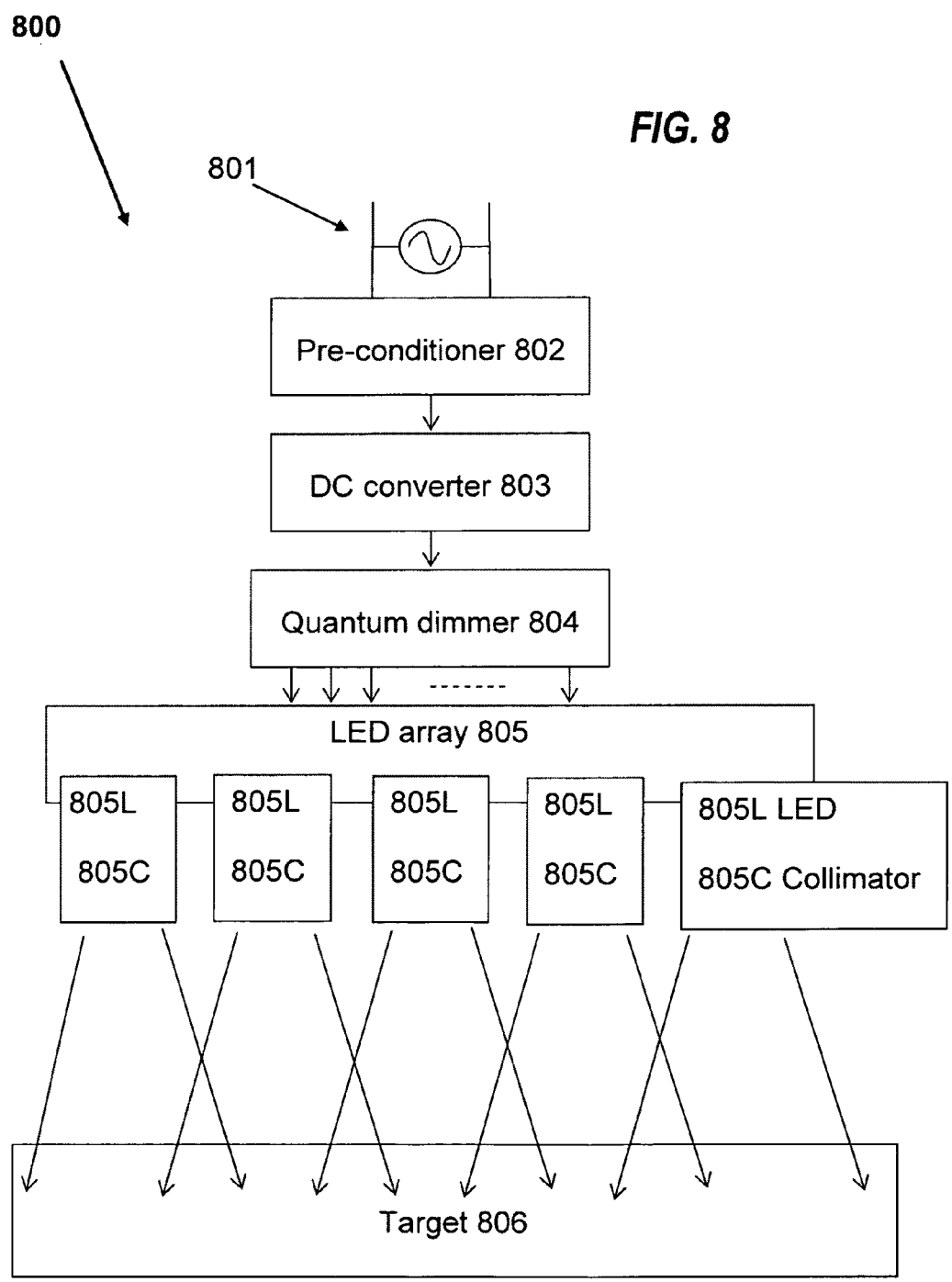
FIG. 8 is a block diagram of a second form of stepped sequential modulation, for separate collimators illuminating a common target.
Figure 17:
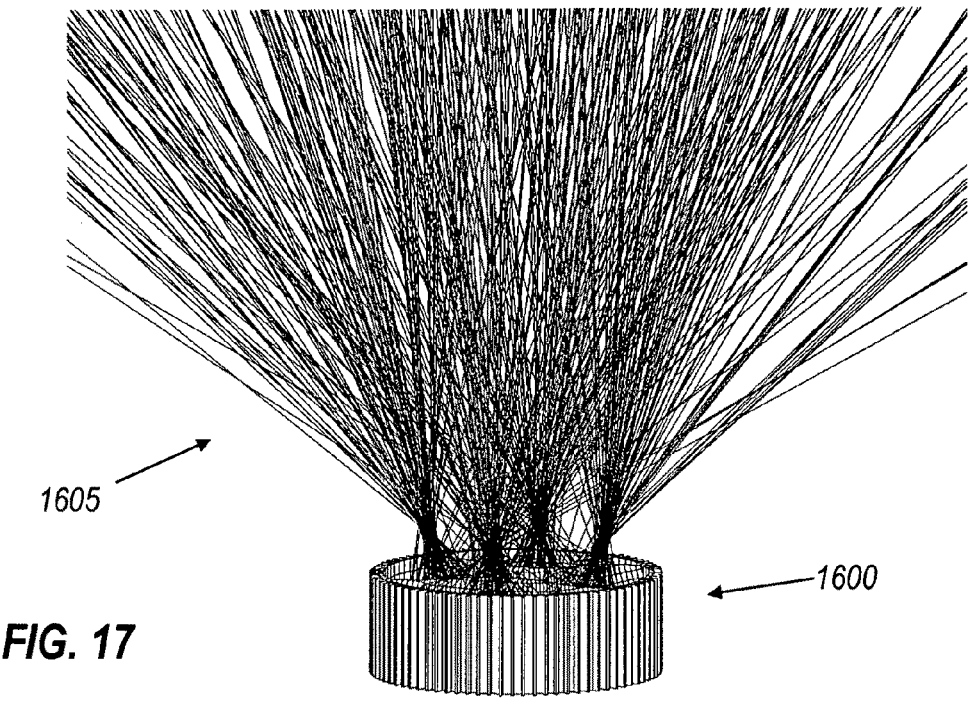
FIG. 17 is a side view of an embodiment of a Quantum Dimmer LED Light Source with four spatially separated LEDs with no homogenizer, illustrating its four-fold beam output.
Figure 18:
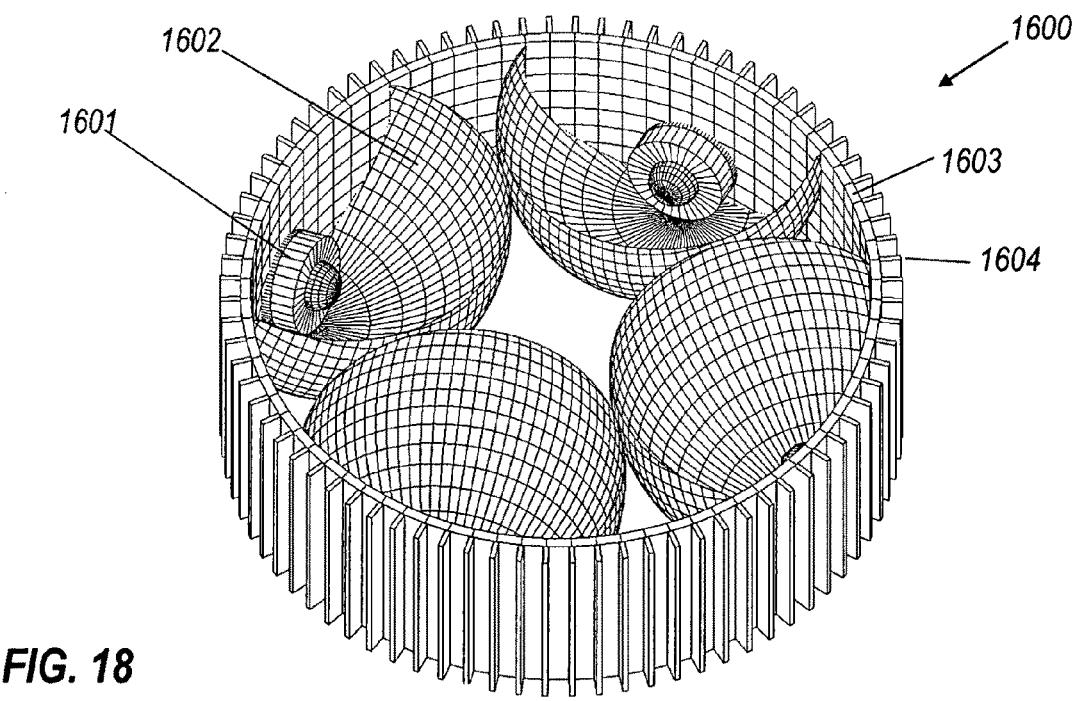
FIG. 18 is a perspective view of the Quantum Dimmer LED Light Source of FIG. 17 showing the position of the LEDs and its four primary reflectors.

FIG. 8 shows a schematic diagram of multi-LED illuminator 800, comprising AC input line 801, pre-conditioner 802, DC converter 803, quantum dimmer 804, and collimated LED array 805, comprising individual LED light sources 805L and corresponding individual collimators 805C. In this embodiment, target 806 receives overlapping, but not coincident, beams from the individual collimators 805C of the light output of array 805. Quantum dimmer 804 selectively activates a subset of the LEDs 805L of array 805 to produce less than full-luminosity output. The illumination pattern on target 806 integrated over the whole cycle can be made spatially uniform as long as the collimators 805C have identical perceived luminosity. In contradistinction to the possibility of using very slow sequential stepped modulation in the preceding Figures, where each source 805L is a single LED, illuminator 800 requires high speed (preferably at least 120 Hz for the complete cycle) to escape visual perception of the spatial jumping of light from individual beam to beam in the course of the stepped sequential modulation. FIGS. 17 & 18, discussed below, show an example of a multi-beam light source for quantum dimming. Each of four beams is formed from the light output of 9 chips, for N=36. At some of the 35 dimmed levels, the number of active LEDs within each group of 9 chips, and therefore the light output from each group, varies from step to step. The same high cycle rate as for single LEDs is then appropriate. Alternatively, FIGS. 17 & 18 could be operated at N=9, with nine groups of chips each comprising one chip on each beam operated together. The nine illumination patterns would then be much more nearly identical, and a slower step rate may be acceptable.

The embodiments of FIGS. 1-3 can in principle be step-sequentially modulated as slowly as once per hour (or longer as needed), as long as optical homogenization is achieved. If spatial homogenization of the static illumination from each LED is achieved, but imperfect temporal homogenization at the switching points results in a perceptible flicker, the stepped sequential modulation of FIGS. 1-3 can be used with a switching speed of preferably at least 120 Hz per step to avoid a perceptible flicker, but the speed for the complete cycle can be slower by a factor of N.

Figures 9, 10A, 10B:
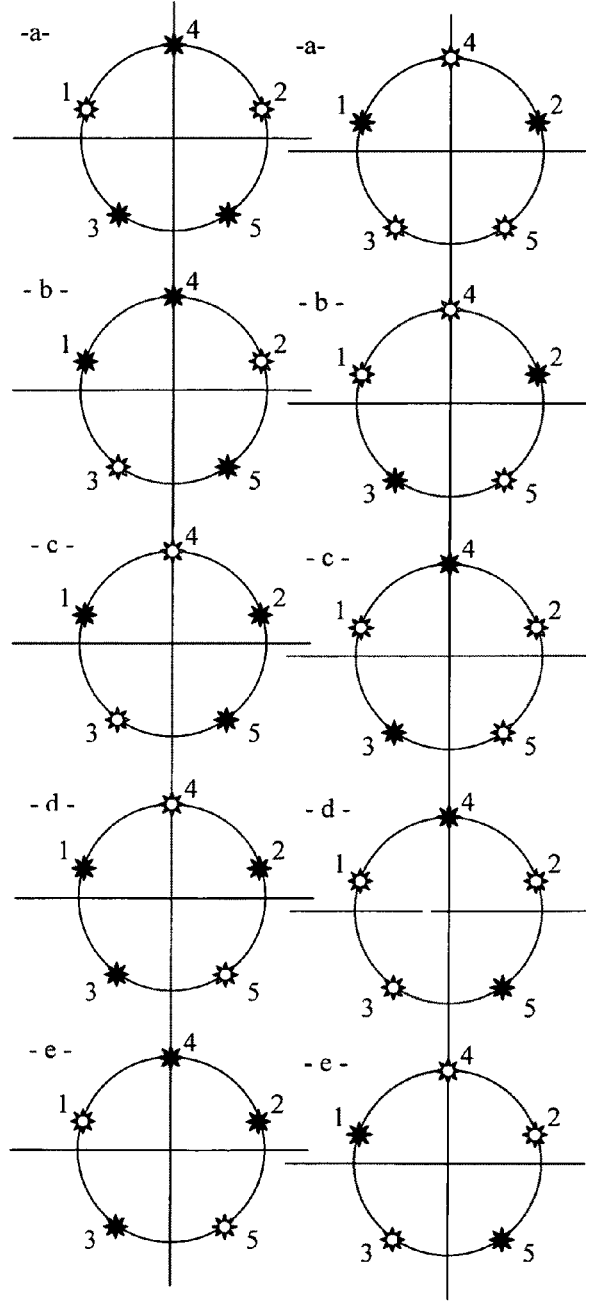
FIG. 9 provides in tabular form an example sequential firing sequence for a quantum dimmer using sequential stepped modulation for an array of 5 LEDs.
FIG. 10A provides a pictorial representation of the sequence shown in FIG. 9 for a dimming setting of 3 LEDs or 60% dimming.
FIG. 10B provides a pictorial representation of the sequence shown in FIG. 9 for a dimming setting of 2 LEDs or 40% dimming.

FIG. 9 is a table listing an example sequence for a 5-LED array, with zeroth column 900 showing the various dimming levels in a 5-member LED array, with first column 901 through fifth column 905 showing the respective activation patterns of the five individual LEDs. Each row shows one step in the cycle. In each case the quantum dimming proceeds by rotating the on-load among the various individual LEDs, each of which is run at full current for its short part of the entire cycle.

Referring to FIGS. 10A and 10B (collectively "FIG. 10"), FIG. 10A provides a pictorial representation of a dimming setting of 3 LEDs or 60% dimming for a 5-member LED array as described with reference to FIG. 9, if the LEDs shown by dark symbols in FIG. 10A are on. FIG. 10B provides a pictorial representation of a dimming setting of 2 LEDs or 40% dimming for a 5-member LED array as described with reference to FIG. 9, if the LEDs shown by dark symbols in FIG. 10B are on. In the arrangement shown in FIG. 10, LEDs that are adjacent in the cycle are not adjacent spatially, which makes it possible to improve the spatial uniformity of the light output over time. In the sequences shown in FIG. 10, the pattern of light and dark LEDs will appear to rotate (counterclockwise as seen in FIG. 10) once per cycle. Since, however, the spatial sequence alternates light and dark twice in the circle, the sequence will have an apparent rotation rate of twice per cycle. In the specific configuration of FIG. 10, with five LEDs, the alternation will not be quite even, because at one point there are two adjacent LEDs in the same state. The visual effect, however, will be considerably less scintillating than a simple pattern rotating once per cycle.

Figure 11:
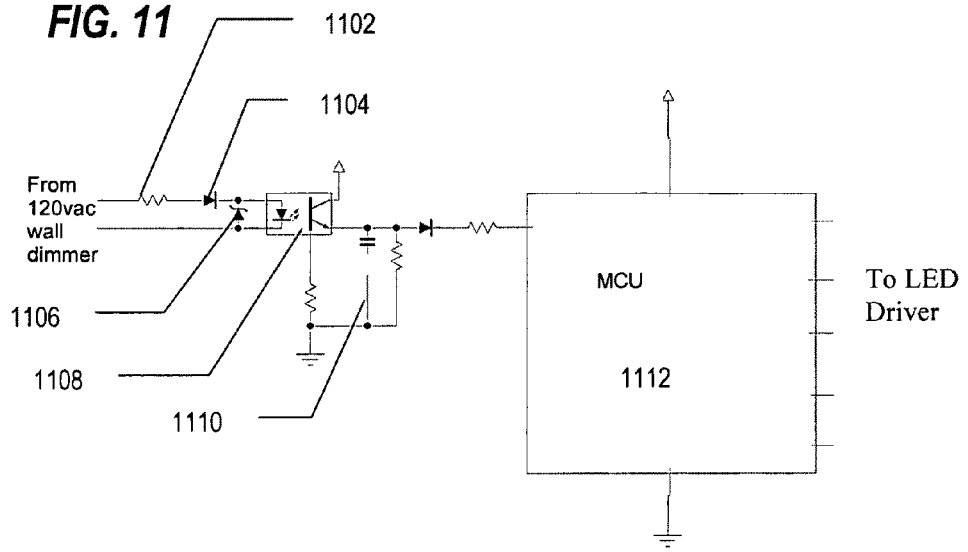
FIG. 11 is an embodiment of an electronic circuit for monitoring the output from a standard AC dimmer to determine the level of dimming required.

FIG. 11 is a circuit diagram, using standard circuit symbols, of an embodiment of an electronic circuit for monitoring the output from a standard AC dimmer to determine the level of dimming required.

Figure 12:
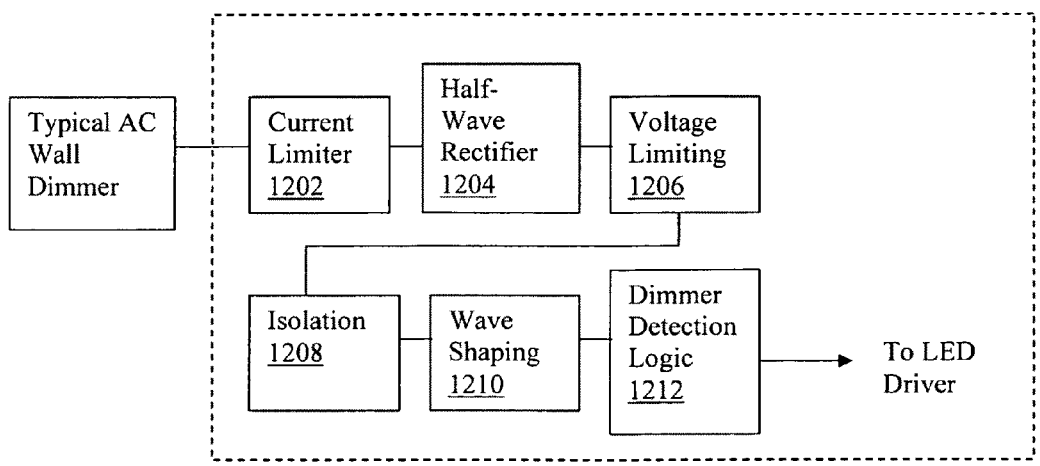
FIG. 12 is a block diagram of the computer controlled LED driver that interfaces with the circuit of FIG. 11 and that controls the output of the LED array.

FIG. 12 is a block diagram of the command signal monitoring circuit that interfaces with the computer-controlled LED driver circuit. The monitoring circuit controls the output of the LED array, of which the circuit diagram in FIG. 11 is an embodiment. As shown in FIG. 12, the circuit comprises a current limiter 1202 (resistor 1102 in FIG. 11), a half-wave rectifier 1204 (diode 1104 in FIG. 11), a voltage limiter 1206 (reverse-biased Zener diode 1106 in FIG. 11), an isolator 1208 (opto-coupler 1108 in FIG. 11), a wave shaper 1210 (RC circuit 1110 in FIG. 11), and dimmer detection logic 1212 (microcontroller (MCU) 1112 in FIG. 11).

Referring to FIGS. 11 and 12, the dimmer detection logic is a low-voltage circuit, typically around 5 volts, and requires very little current. A high value current-limiting resistor is used to keep the current through the dimmer detection low. The dimmer detection is designed to require only the positive phase of the AC input, so a single diode is used as a half-wave rectifier. A simple 5 volt Zener diode can be used for voltage limiting to 5 volts. An opto-isolator further protects the dimmer detection logic from any irregularities in the incoming signal. The monitoring circuit then extracts the data content from the AC signal in the form of a time-modulated (usually PWM) signal, at logic voltages determined by the power supply to the photoconductive diode of the opto-coupler. The RC wave shaping is used to produce a good sharp edge for both the leading edge and trailing edge of the AC wave form. With a typical triac dimmer, the leading edge is switched as the dimming control, but the trailing edge occurs when the AC signal crosses zero. Consequently, wave shaping is usually desirable at the trailing edge, and is desirable at the leading edge at least when the dimming level is close to full on, although at intermediate dimming levels a strong leading edge may already be present.

The isolation is needed if the dimmer detection logic is powered by a different power supply. If the dimmer detection logic is also powered from the same AC source that carries the incoming signal, the isolation may be omitted, the wave shaping may not be necessary and, because the dimmer detection logic can be very high impedance, the voltage-limiting resistor can also be a much larger value. This allows for the use of few, low cost, components. The dimmer detection logic may be a suitably programmed microcontroller unit MCU. The incoming triac signal, after shaping by the circuitry shown in FIGS. 11 and 12, can be interpreted as a PWM command signal. Circuits and algorithms for such interpretation are known and, in the interests of conciseness, will not be described in further detail here.

Figure 13:
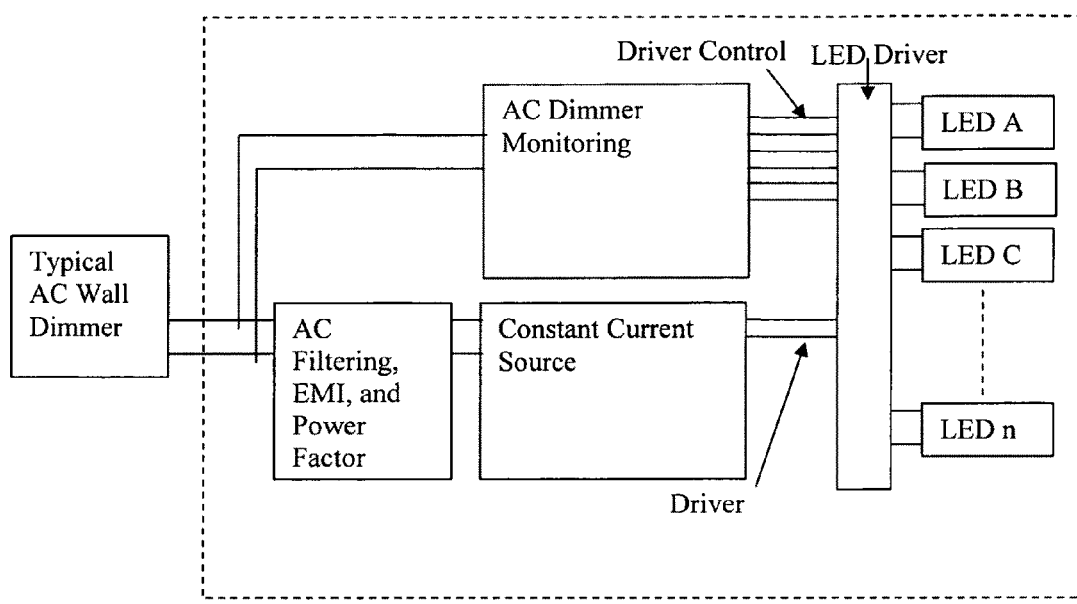
FIG. 13 is a block diagram of a quantum dimmer controlled light source connected to dimmed AC mains.

FIG. 13 is a block diagram of a quantum dimmer controlled light source connected to AC mains. The basic design is split into two paths. The AC dimmer monitoring path detects the level of dimming. The constant-current source path is the power supply for the LEDs. The AC dimmer-monitoring is shown in FIG. 12. The constant-current source path includes a section to help isolate the constant-current source from the AC. Depending on the constant-current source, this may include some AC filtering to prevent most noise and power fluctuation from the AC side from affecting the constant-current source; EMI filtering to minimize EMI from the constant current source from being injected into the AC; and power factor compensation to balance the impact on the AC and also so as not to affect the operation of an AC dimmer. Control signals from the AC Dimmer Monitoring block, and power from the Constant Current Source, are then fed to the LED Driver block, which feeds quantum-dimmed power, with a duty cycle determined from the triac duty cycle detected on the incoming AC power, to the LEDs A, B, C, . . . n.

Figure 14A:
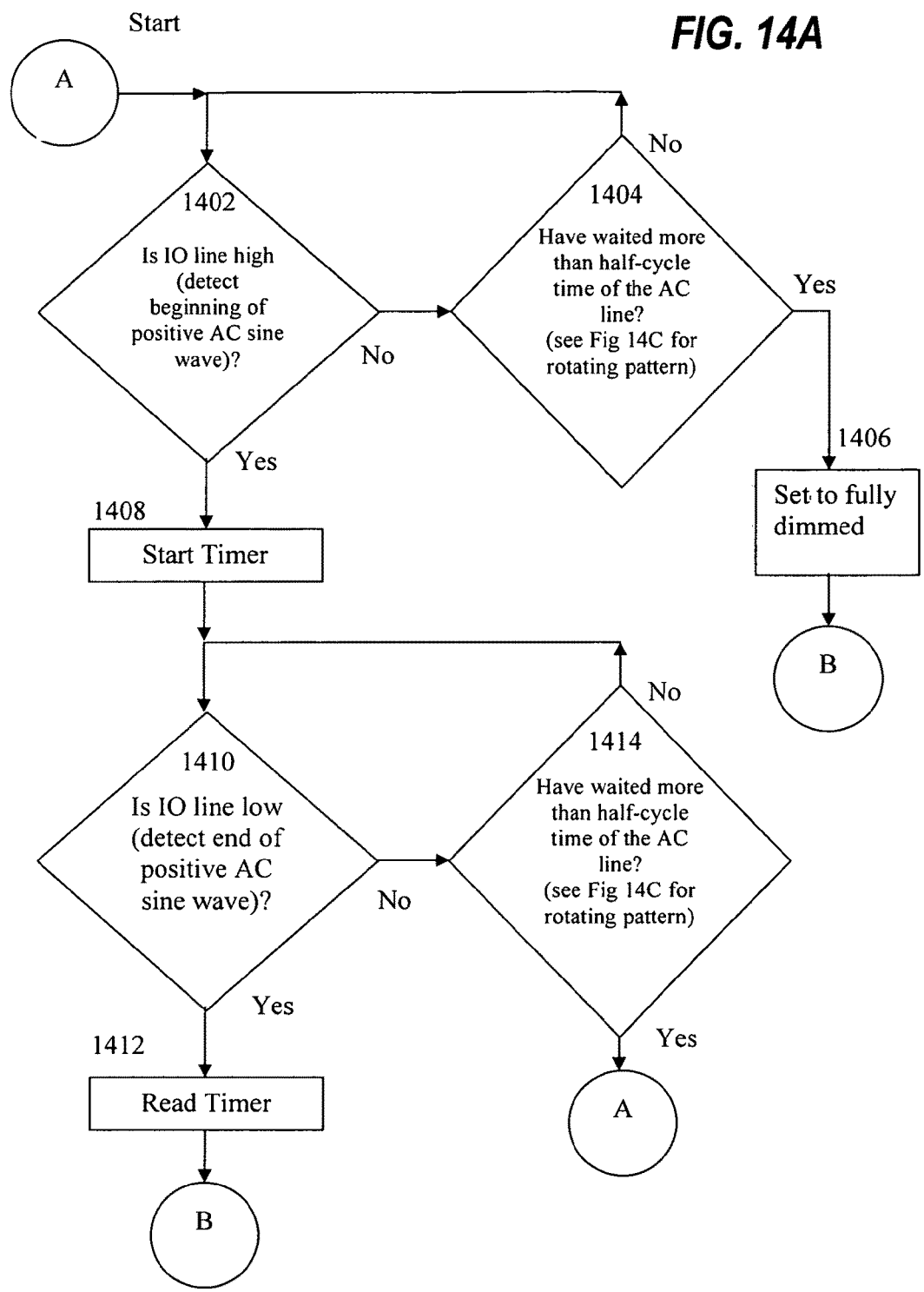
FIGS. 14A to 14C together form a flow diagram of the computer software controller for the quantum dimmer.
Figure 14B:
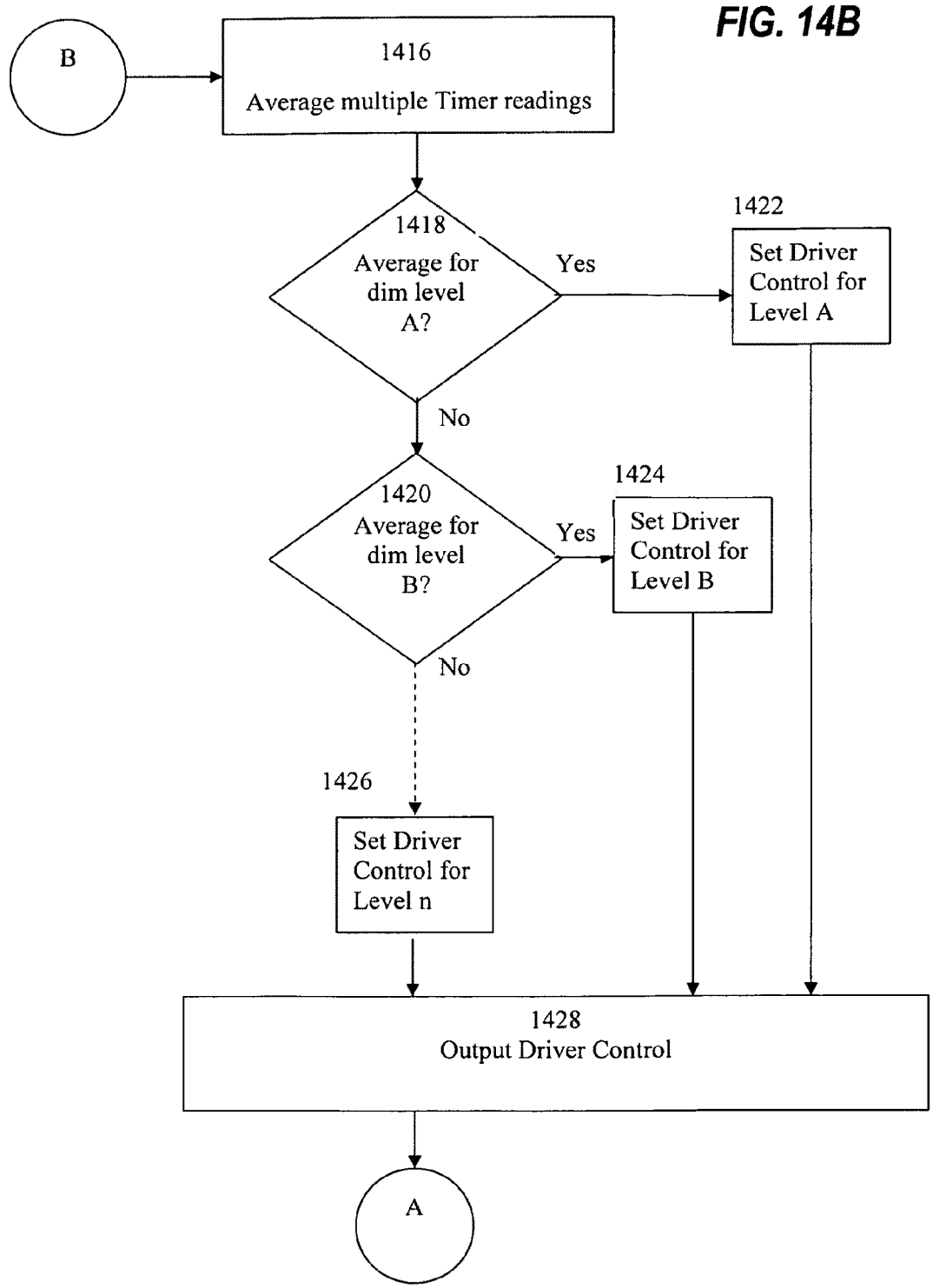
Figure 14C:
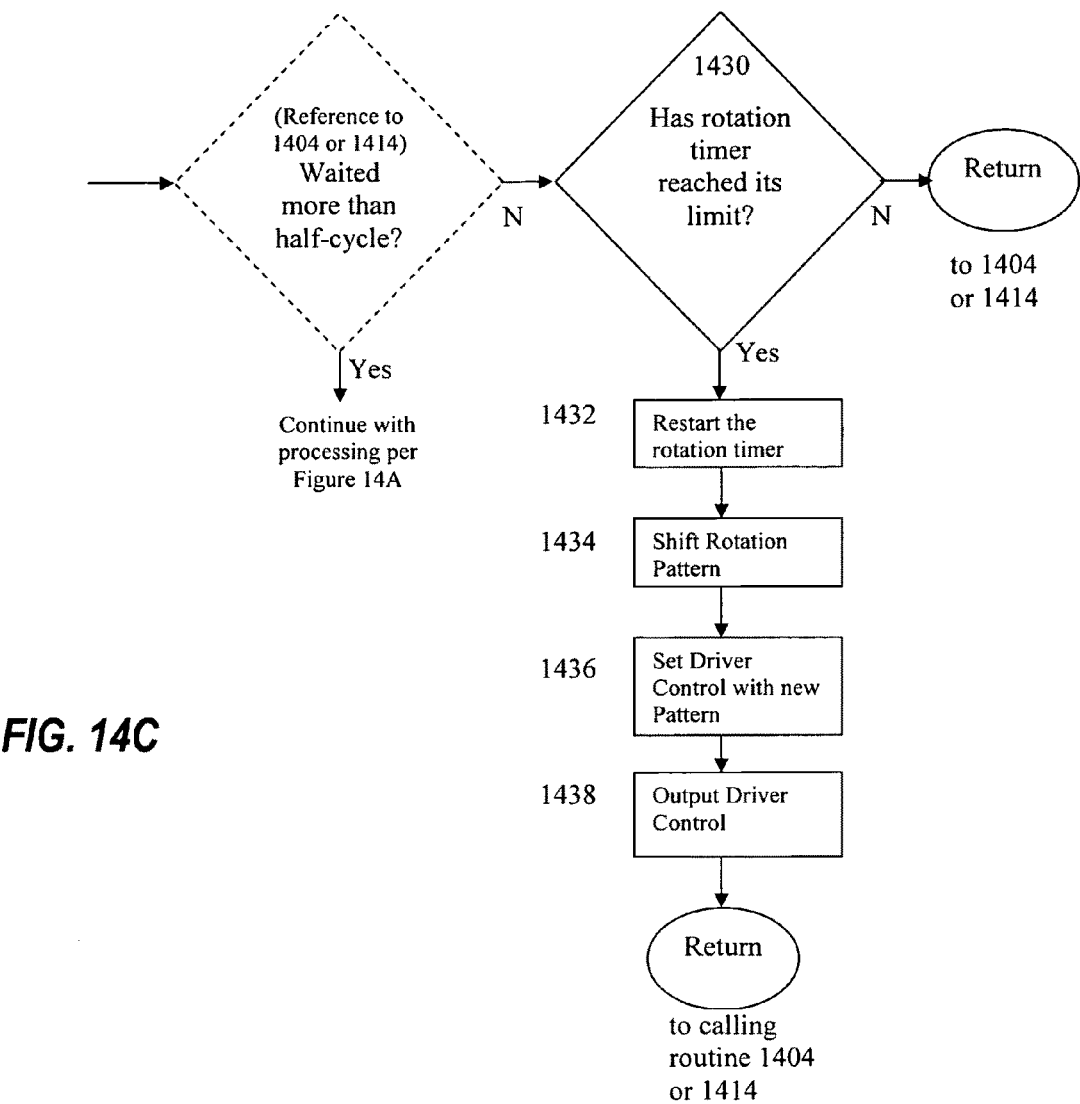

FIGS. 14A to 14C (collectively FIG. 14) show the flow diagram of an embodiment of the computer software controller for the quantum dimmer. FIGS. 14A and 14B constitute a single flow diagram, divided into two parts for better presentation on standard-sized drawing sheets. FIG. 14C shows a subroutine that is executed in certain cells of FIG. 14A.

The basic concept for the dimmer detection is to wait for the rising edge of the positive AC and then measure the time until detecting the falling edge of the AC. The shorter this time is, the more dimming is required. There is some time-out consideration in case the AC is off or the dimming is so low it cannot be detected. The timer value is averaged over a number of readings to help avoid the effects of noise and other voltage fluctuations.

Referring initially to FIG. 14A, in step 1402 the process tests whether the incoming AC line has gone high, indicating the beginning of a clipped AC pulse from the triac. If not, in step 1404, the process tests whether it has waited for more than a cycle of the AC line. If not, the process returns to the beginning and continues to test for the AC line to go high. If the incoming AC line has remained low for an entire cycle, the process infers that the controlling wall dimmer is set to off, or to a dimming level too low to process, and in step 1406 passes a "fully dimmed" setting to the LED controller.

If in step 1402 the incoming AC line goes high, indicating the rising edge, then in step 1408 a triac pulse timer is started. In step 1410, the process then monitors for the AC line to go low, and when it does so, in step 1412 the triac pulse timer is read. That reading indicates the dimming level to which the triac wall dimmer is set. The level is passed to the LED controller. As long as step 1410 does not detect a falling edge, the process loops through step 1414, which tests whether the process has waited for more than half a cycle. If so, the process infers that it has missed a falling edge and the following rising edge, and either passes the LED controller a "maximum luminosity" setting, on the assumption that the line must have been low for only a minimal period, or issues an error signal or, as shown in FIG. 14A, simply returns to the beginning to wait for the next cycle.

Referring now to FIG. 14B, after a setting has been passed to the LED controller in step 1406 or 1412, the process proceeds to step 1416, where a binned or rolling average of the last few readings is generated, to guard against transient noise on the line confusing the controller. In steps 1418, 1420, etc., the averaged LED controller setting is then compared against the settings for each dimming level in turn, and in the relevant one of steps 1422, 1424, 1426, etc., the Driver Control is set to the appropriate setting. In step 1428, the new setting is output by the Driver control to the LEDs. The process then returns to the beginning to detect another AC pulse and generate a new setting.

Referring to the portion of the flow diagram shown in FIG. 14C, which can apply for those cases where it is advantageous to rotate the pattern of the LEDs, the rotation rate may be different from the 50/60 Hz of the AC. This process may be carried out as a branch from step 1404 and/or step 1414, using spare processor capacity while waiting for the AC edge to rise and/or while waiting for the AC to drop. In step 1430, the process tests whether a rotation step timer has reached the time limit for changing the pattern. If not, the process returns to step 1402 or 1410 and continues to test for a rising or falling edge. If the rotation timer has reached its limit, then in step 1432 the rotation timer is restarted. In step 1434 the rotation pattern is shifted (for example, to the next row in the table of FIG. 9), in step 1436 the Driver Control is set with the new pattern, and in step 1438 the new pattern is output to the LEDs. The process then returns to step 1404 or 1414, and continues to test for a rising or falling edge in step 1402 or 1410. If the rotation step length is greater than the AC signal frequency, the branch to step 1430 may occur only once in each cycle.

If the incoming AC signal is full-wave rectified, instead of half-wave rectified, by the rectifier of FIG. 12, then the process of FIGS. 14A and 14B will execute every half cycle, typically 100 or 120 Hz. However, this affects only how soon the dimmer responds to a change in the duty cycle of the incoming AC signal. Very few people will notice a delay of $1/60$ of a second in responding to the operation of the triac dimmer, so the extra complication of full-wave rectification is not usually worthwhile.

Figures 15, 16:
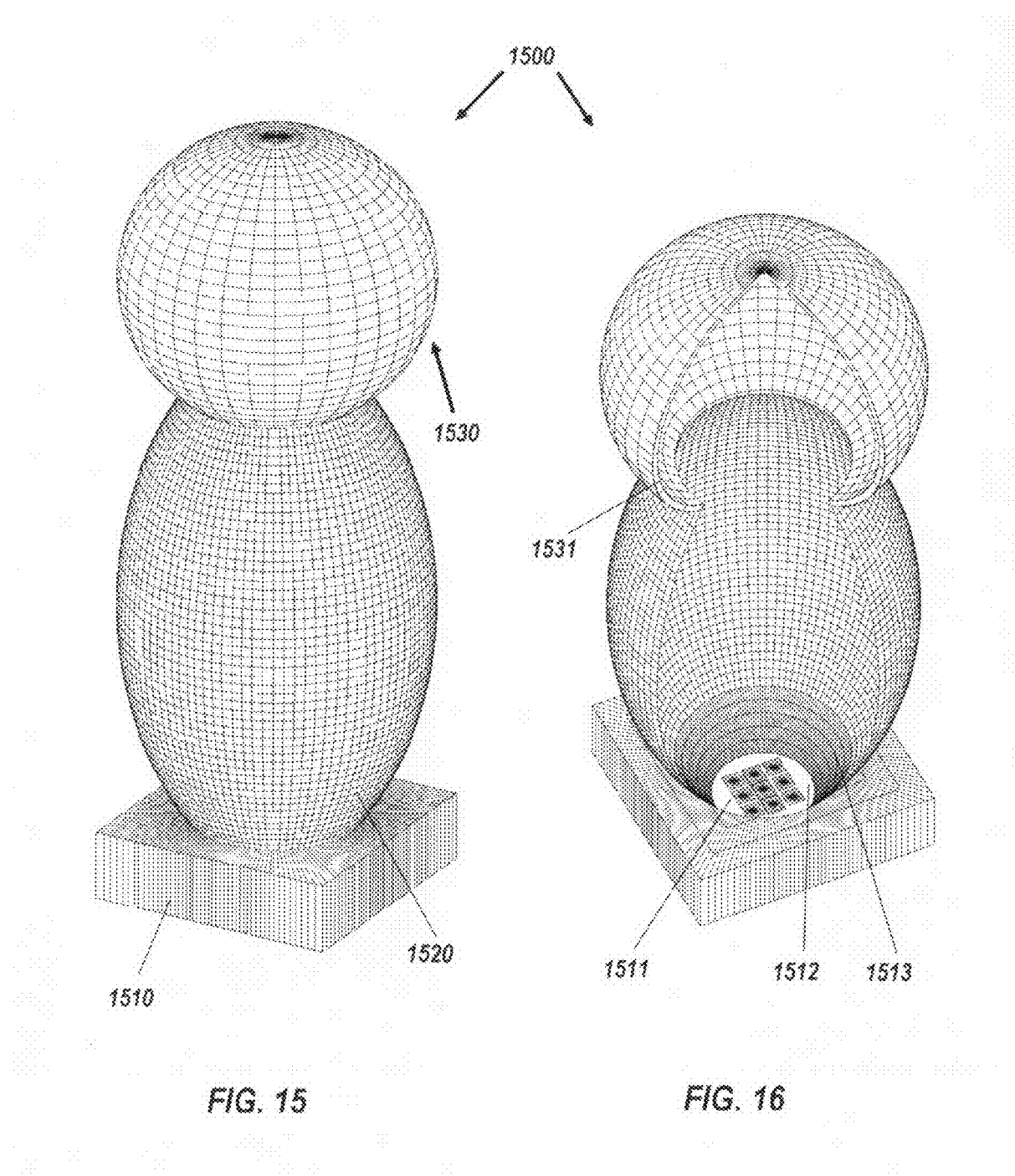
FIG. 15 is a perspective view of an embodiment of a Quantum Dimmer LED Light Source that uses an homogenizer.
FIG. 16 is a cutaway perspective view of the light source of FIG. 15 showing a 3×3 array of LEDs.

FIGS. 15 and 16 show an embodiment of a Quantum Dimmer LED Light Source that uses a homogenizer. The embodiment makes use of the embodiment shown in FIGS. 57A and 57B of aforementioned US Patent Application No. 2009/0067179. FIG. 15 shows an external perspective view of light source 1500, comprising LED package 1510, compound elliptical concentrator 1520, and upper sphere 1530. Although both concentrator 1520 and sphere 1530 are solid bodies formed of a transparent dielectric material, they are drawn as opaque, hollow surfaces per the conventions of computer drawings of surfaces, which causes FIG. 16 to depict a hollow shell when it is in fact a solid but transparent one. The concentrator 1520 may function by total internal reflection, without even requiring a reflective coating over the exposed part of its surface.

FIG. 16 shows a cutaway perspective view of light source 1500, further showing that LED package 1510 comprises array 1511 of blue LEDs, reflective surface 1512 surrounding the LEDs, and conical reflector 1513. LED array 1511 is recessed into LED package 1510. The top of reflector 1513 is even with the transparent top surface (not shown) of package 1510, to which the bottom surface (not shown) of concentrator 1520 is optically bonded to eliminate any air gap. Blue light from LEDs 1511 shines upward into concentrator 1520, within which it remains trapped by total internal reflection. The blue light proceeds upward into sphere 1530, striking its external surface, upon which is placed phosphor coating 1531. Light source 1500 can thus be classified as a remote phosphor system. Furthermore one, two or three LEDs 1511 can be red, enabling light source 1500 to have a tunable color temperature. In this case the red LEDs could still participate in the quantum dimming, since they contribute to overall luminosity, or they could be separately controlled in coordination with the quantum dimming of the blue, but not necessarily following the same detailed time course. Finally, the red LEDs could be pulse width modulated such that a constant color temperature is achieved at all levels of dimming.

A preferred system using the embodiment of FIG. 16 that has 6 blue and 3 red can theoretically achieve a color temperature of approximately 2900K, with a color rendering index (CRI) of 89 and an efficacy of 60 lumens per watt or better using the following components and setup. The blue LEDs have a peak wavelength of 454 nm and are assumed to have a blue output of 210 mW per 1 W electrical input. Each blue LED is operated using approximately 1.26 W electrical. The LED chip is top-emitting 1 mm square OSTAR chip, which can be obtained from OSRAM Opto of Germany. The red LED chips are 1 mm square OSRAM Golden Dragon with a peak wavelength of 634 nm. The efficacy of the red OSRAM chip is specified to be approximately 60 lumens per watt. Each of the red LEDs is operated at 0.77 watts electrical and produces 47 lumens per LED. The phosphor is product EY4254 by Intematix of California. The phosphor is mixed with a clear UV curable epoxy, UV15-7 from Master Bond Inc. of New Jersey. The phosphor is mixed using a phosphor-to-epoxy weight-to-weight ratio of 15:100. The thickness of the epoxy-phosphor coating is approximately 0.0387 inches (983 microns) on sphere 1530. The efficacy of such a system can be doubled if the blue chip is replaced with the latest chip from CREE Inc. of North Carolina or Nichia Corporation of Japan. The current best blue from CREE is claimed to have a blue output of over 500 mW per 1 W electrical input at the required wavelength. Using for example the CREE chip system efficacies well over 100 lumens per watt can be achieved with a CRI 89 or better at all dimming levels.

FIGS. 17 and 18 show an embodiment of a Quantum Dimmer LED Light Source with spatially separated LEDs having no homogenizer. This embodiment makes use of the embodiment of FIGS. 1E and 1B of aforementioned U.S. patent application Ser. No. 12/456,392. FIG. 17 is a lateral perspective view of light source 1600, showing the light emission 1605 of all four of its output beams. A uniform beam pattern is created by the overlapping patterns from the four light sources, as seen in FIG. 2 of the same US patent application.

FIG. 18 is a perspective end view of light source 1600, comprising LED packages 1601, ellipsoidal reflectors 1602, mounting cylinder 1603, and convective fins 1604 It is possible for LED packages 1601 to be multi-chip, particularly the 3×3 type shown in FIG. 16. Individual control of chips within each 9-chip package enables the quantum dimming of all 36 individual chips as a unit. Also, including one or two red chips within each LED package 1601 enables the same color temperature control as for FIG. 16. If the number of steps in the quantum dimming cycle is fewer than the number of available LEDs, then LEDs in different ones of the 9-chip packages may be switched together in each phase L-1, L-2, etc., giving better spatial uniformity than if each package 1601 was assigned to a different phase L-1, L-2, etc.

Figure 19:
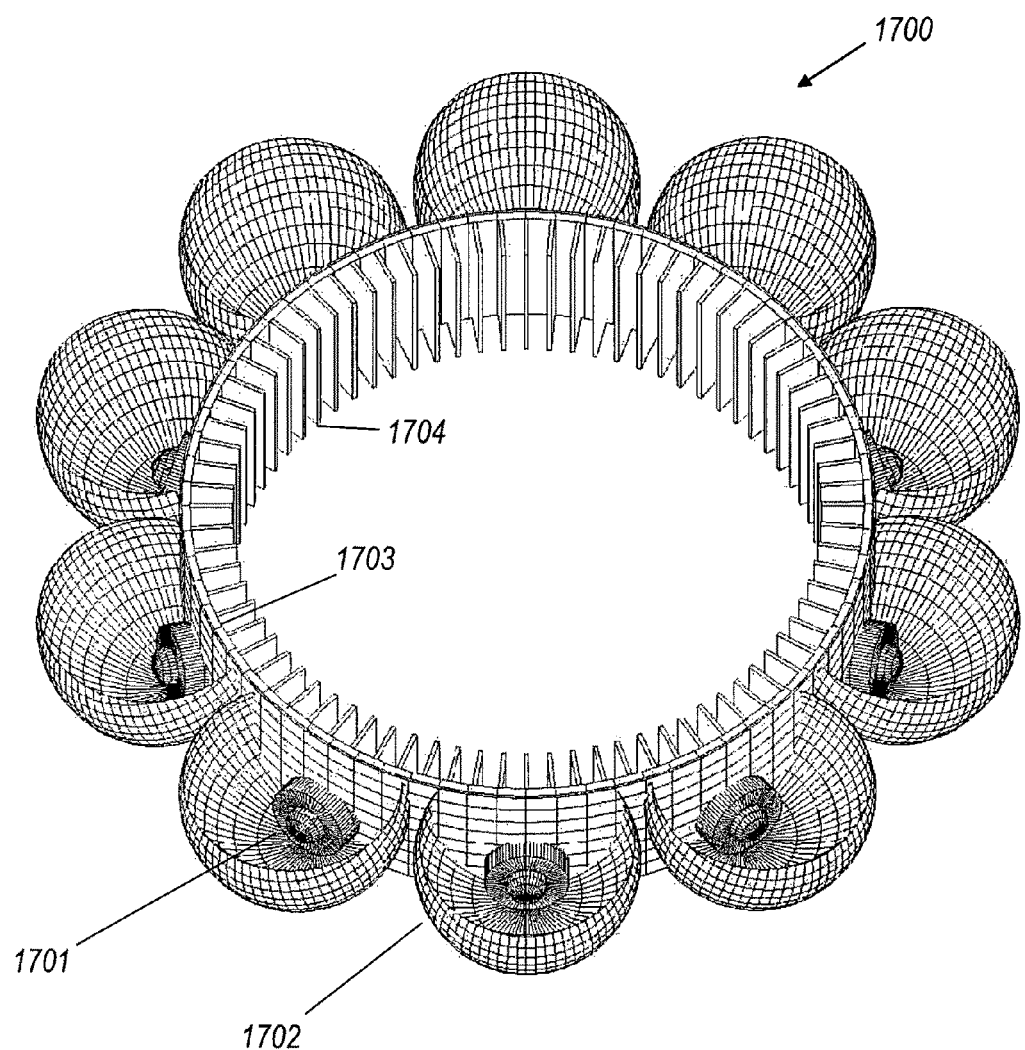
FIG. 19 is a perspective view of a Quantum Dimmer LED Light Source with alternating color spatially separated LEDs using a 10-fold reflector with no homogenizer.

FIG. 19 is perspective view of a 10-fold reflector system 1700 comprising LEDs 1701, exterior reflectors 1702, interior cylinder 1703 upon which they mount, and fins 1704 of an interior heat sink. This preferred embodiment is from FIG. 12 of the aforementioned U.S. patent application Ser. No.

12/456,392. In this application of the Quantum Dimmer, the ten LEDs 1702 may comprise 5 LEDs (or light sources) of one color and 5 LEDs (or light sources) of another color, positioned in an alternating pattern within reflectors 1702. The highest performance is achieved when one set of LEDs are blue chips used in combination with very high efficacy yellow or green phosphor. The blue LEDs with phosphor can be conformal-coated LEDs or the phosphor can be a remote phosphor spatially separate from the blue chips. The second set of 5 LEDs provides the longer red wavelengths to increase the CRI and to produce the required color temperature for the white light. In order for the system to work well, the beam pattern from the one color must match the beam pattern from the other color. In order to provide a uniform color temperature at all dimming levels, the red light sources can be pulse-width modulated (as the amount of flux required from the red is much lower) whereas the blue/yellow light sources can employ quantum dimming for spatially separated sources. This hybrid system, combining SMM with PWM, is also a novel embodiment of this invention.

With some implementations of the luminaires of FIGS. 18 and 19, the spatial frequency of any flicker can be increased, and therefore the visibility of the flicker can be decreased, if the cyclic order of the switching is not the same as the physical order of the LEDs round the luminaire, as shown FIG. 10.

Although several embodiments have been described, the skilled reader will understand how features of different embodiments may be combined.

Variations from the disclosed embodiments are possible. For example, the embodiments describe the light sources as LEDs. LEDs are a currently available example of a light source that has relatively high efficiency, that can be quickly switched on and off, and that is sensitive to over-heating. Thus, LEDs are particularly well suited to benefit from the methods and devices of the present application. The present methods and devices can, however, of course also be used with other types of light source, including light sources currently available, light sources presently known but not today in commerce, and light sources that may be devised or developed hereafter.

The preceding description of the presently contemplated best mode of practicing the invention is not to be taken in a limiting sense, but is made merely for the purpose of describing the general principles of the invention. The full scope of the invention should be determined with reference to the Claims.

The invention claimed is:

1. A method of varying the luminosity of illumination, comprising:
   providing a plurality of light sources, each having an on state in which it emits light and an off state in which it does not emit light;
   switching each of the plurality of light sources cyclically between the on state and the off state in a sequence over a cycle period;
   selecting the switching sequence such that the number of said light sources that are on is uniform over the cycle; and
   varying the luminosity of the illumination by varying the proportion of each cycle for which each light source is switched on.

2. The method of claim 1, wherein all of the plurality of light sources are switched in sequences that are identical but staggered evenly over the cycle period.

3. The method according to claim 1, wherein a length of time for which each light source remains on is not varied, and a number of times within each cycle that each light source is switched on is varied, when varying the luminosity.

4. The method according to claim 1, wherein a length of time for which each light source is switched on is varied, when varying the luminosity.

5. The method according to claim 1, wherein a length of time for which a light source remains on is an integer multiple of the cycle period divided by the number of light sources forming the plurality.

6. The method according to claim 1, wherein the light sources are spaced apart, and wherein an order in which they are switched on and off is selected to maximize a frequency of any spatial shift in an illumination pattern produced by the plurality of light sources.

7. The method according to claim 1, wherein the cycle rate is slower than the threshold flicker frequency of the Standard Human Observer.

8. The method according to claim 7, wherein a rate of switching events within the cycle is above said threshold flicker frequency.

9. The method according to claim 7, wherein a rate of switching events within the cycle is below said threshold flicker frequency, and light outputs of the plurality of light sources are sufficiently spatially homogeneous that any flicker is imperceptible to an ordinary human observer.

10. The method of claim 1, further comprising, when one of said plurality of light sources malfunctions, selecting the switching sequence such that the number of said light sources other than said malfunctioning light source that are on is uniform over the cycle.

11. The method of claim 1, further comprising monitoring a temperature of the light sources and, when overheating is detected, reducing a number of steps within each cycle period for which each light source is in the on state.

12. A method of varying the luminosity of illumination, comprising:
   providing a plurality of light sources, each having an on state in which it emits light and an off state in which it does not emit light;
   switching each of the plurality of light sources cyclically between the on state and the off state in a sequence over a cycle period;
   wherein the cycle period is divided into a number of equal steps that is an integer multiple of the number of light sources, the light sources are switched between the on and off states only at the beginning of a step, and different light sources are on during different steps; and
   varying the luminosity of the illumination by varying the number of steps within each cycle period for which each light source is in the on state.

13. The method of claim 12, further comprising minimizing a number of steps per cycle, and subject to that constraint maximizing a number of times within each cycle period that a light source is switched between the on and off states.

14. An apparatus for providing illumination of varying luminosity, comprising:
   a plurality of light sources, each having an on state in which it emits light and an off state in which it does not emit light; and
   a controller operative
      to switch each of the plurality of light sources cyclically between the on state and the off state in a sequence over a cycle period in a switching sequence such that the number of said light sources that are on is uniform over the cycle period; and to vary the luminosity of the illumination by varying the proportion of each cycle period for which each light source is switched on.

15. The apparatus of claim 14, wherein the controller is operative to switch all of the plurality of light sources in sequences that are identical but staggered evenly over the cycle period.

16. The apparatus of claim 14, wherein the controller is operative to vary the number of times within each cycle period that each light source is switched on, without varying the length of time for which each light source remains on, when varying the luminosity.

17. The apparatus according to claim 14, wherein the controller is operative to switch the light sources at a cycle rate slower than the threshold flicker frequency of the Standard Human Observer.

18. The apparatus according to claim 17, wherein the controller is operative to switch the light sources at a rate of switching events above said threshold flicker frequency.

19. The apparatus according to claim 17, wherein the controller is operative to switch the light sources at a rate of switching events below said threshold flicker frequency, and wherein light outputs of the plurality of light sources are sufficiently spatially homogeneous that any flicker is imperceptible to an ordinary human observer.

20. The apparatus of claim 17, wherein the controller is operative to detect a malfunction of one of said plurality of light sources and to switch only the remaining light sources in a modified cycle.

* * * * *